(12) United States Patent
Kim et al.

(10) Patent No.: US 9,484,588 B2
(45) Date of Patent: Nov. 1, 2016

(54) COMPOUND, COMPOSITION INCLUDING COMPOUND, COMPOSITE FORMED THEREFROM, ELECTRODE USING COMPOSITION OR COMPOSITE, COMPOSITE MEMBRANE USING COMPOSITE, AND FUEL CELL INCLUDING AT LEAST ONE SELECTED FROM ELECTRODE AND COMPOSITE MEMBRANE

(71) Applicant: SAMSUNG ELECTRONICS CO., LTD., Suwon-si, Gyeonggi-do (KR)

(72) Inventors: Ki-hyun Kim, Yongin-si (KR); Seong-woo Choi, Yongin-si (KR); Jong-chan Lee, Seoul (KR); Pil-won Heo, Yongin-si (KR); Kihyun Kim, Seoul (KR); Sung-kon Kim, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 277 days.

(21) Appl. No.: 13/747,712

(22) Filed: Jan. 23, 2013

(65) Prior Publication Data

US 2013/0196248 A1   Aug. 1, 2013

(30) Foreign Application Priority Data

Jan. 27, 2012   (KR) .................. 10-2012-0008528

(51) Int. Cl.
*H01M 8/10* (2016.01)
*C08G 77/30* (2006.01)
*C08G 77/00* (2006.01)

(52) U.S. Cl.
CPC ............ *H01M 8/1037* (2013.01); *C08G 77/30* (2013.01); *H01M 8/1041* (2013.01); *C08G 77/80* (2013.01); *Y02E 60/523* (2013.01)

(58) Field of Classification Search
None
See application file for complete search history.

(56) References Cited

U.S. PATENT DOCUMENTS

2009/0048395 A1*  2/2009  Mohwald et al. ............ 524/588
2010/0104918 A1   4/2010  Nowak et al.

FOREIGN PATENT DOCUMENTS

| JP | 2008-291097 A | 12/2008 |
| KR | 100800313 B1 | 1/2008 |
| KR | 1020090100970 A | 9/2009 |
| WO | WO 2011069077 A1 * | 6/2011 |

OTHER PUBLICATIONS

Liu, Y. et al., Preparation, Characterization, and Properties of Novel Polyhedral Oligomeric Silsesguioxane-Polybenzimidazole Nanocomposites by Friedel-Crafts Reaction, Macromolecules 2010, 43: 6731-6738.
Roll, M. F. et al., para-Octaiodophenylsilsesquioxane, [p-IC6H4SiO1.5]8, a Nearly Perfect Nano-Building Block, ACS Nano. 2008; 2(2): 320-326. doi: 10.1021/nn700196d.

* cited by examiner

*Primary Examiner* — Sarah A Slifka
*Assistant Examiner* — Haroon S Sheikh
(74) *Attorney, Agent, or Firm* — Cantor Colburn LLP

(57) ABSTRACT

A compound including a cage-type structure of silsesquioxane wherein a group represented by Formula 1 or a salt thereof is directly linked to at least one silicon atom of the silsesquioxane, a composition including the compound, a composite formed therefrom, electrodes and an electrolyte membrane that include the composite, a method of preparing the compound, and a fuel cell including the electrodes and the electrolyte membrane.

Formula 1

$$-\phantom{}\!\!\!\bigcirc\!\!\!-[P(=O)(OH)_2]_n$$

wherein in Formula 1, n is 1 or 2.

7 Claims, 15 Drawing Sheets

COMPOUND, COMPOSITION INCLUDING COMPOUND, COMPOSITE FORMED THEREFROM, ELECTRODE USING COMPOSITION OR COMPOSITE, COMPOSITE MEMBRANE USING COMPOSITE, AND FUEL CELL INCLUDING AT LEAST ONE SELECTED FROM ELECTRODE AND COMPOSITE MEMBRANE

CROSS-REFERENCE TO RELATED APPLICATIONS

This application claims priority to and the benefit of Korean Patent Application No. 10-2012-0008528, filed on Jan. 27, 2012, and all the benefits accruing therefrom under 35 U.S.C. §119, the content of which is incorporated herein in its entirety by reference.

BACKGROUND

1. Field

The present disclosure relates to compounds, compositions including the compounds, composites formed therefrom, electrodes including the composition or the composite, composite membranes including the composites, and fuel cells including at least one selected from the electrodes and the composite membranes.

2. Description of the Related Art

According to types of an electrolyte and fuel used, fuel cells can be classified as polymer electrolyte membrane fuel cells ("PEMFCs"), direct methanol fuel cells ("DMFCs"), phosphoric acid fuel cells ("PAFCs"), molten carbonate fuel cells ("MCFCs"), and solid oxide fuel cells ("SOFCs").

PEMFCs operating at 100° C. or higher temperatures in non-humidified conditions, as compared to those operable at low temperatures, do not need a humidifier, and are known to be convenient in terms of control of water supply and highly reliable in terms of system operation. In addition, such PEMFCs may become more durable against carbon monoxide (CO) poisoning that may occur with fuel electrodes as they operate at high temperatures, and thus, a simplified reformer may be used therefor. Thus, PEMFCs are increasingly drawing attention for use in middle-temperature and high-temperature, non-humidified systems.

Along with the current trends for increasing the operation temperature of PEMFCs as described above, fuel cells operable at middle and high temperatures are drawing more attention.

However, electrolyte membranes of fuel cells that have been developed so far do not exhibit satisfactory proton conductivity, physical properties and durability in middle and high temperate ranges, and thus, still need further improvement.

SUMMARY

Provided are compounds, compositions including the compounds, composites formed therefrom, electrodes including the composition or the composite, composite membranes including the composites, methods of manufacturing the compounds, and fuel cells including at least one selected from the electrodes and the composite membranes and thus having excellent cell performances.

Additional aspects will be set forth in part in the description which follows and, in part, will be apparent from the description, or may be learned by practice of the presented embodiments.

According to an aspect, a compound includes a cage-type structure of silsesquioxane in which a group represented by Formula 1 below or a salt thereof is directly linked to at least one silicon atom of the silsesquioxane:

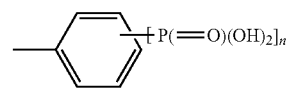

Formula 1 wherein in Formula 1, n is 1 or 2.

According to another aspect, a composition includes the compound described above.

The composition may further include a conductive polymer or a phosphoric acid-based material.

According to another aspect, a composite includes a reaction product of the composition described above.

According to another aspect, a composite membrane includes the composite described above.

According to another aspect, an electrode includes the composition or a composite, which is a reaction product of the composition.

According to another aspect, a fuel cell includes a cathode, an anode, and an electrolyte membrane interposed between the cathode and the anode, wherein the electrolyte membrane is the composite membrane described above.

According to another aspect, a fuel cell includes a cathode, an anode, and an electrolyte membrane interposed between the cathode and the anode, wherein at least one of the cathode and the anode comprises the composition or a composite, which is a reaction product of the composition.

According to another aspect, there is provided a method of preparing a compound represented by Formula 6A below including hydrolyzing a compound represented by Formula 11 below:

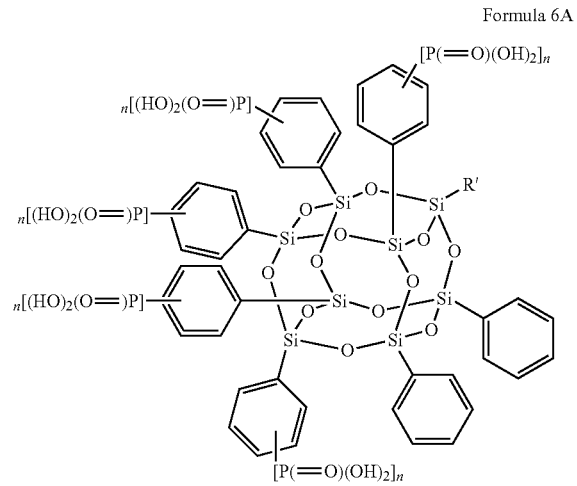

Formula 6A wherein in Formula 6A, each n is independently 1 or 2, and

R' is a substituted or unsubstituted $C_1$-$C_{20}$ alkyl group,

Formula 11

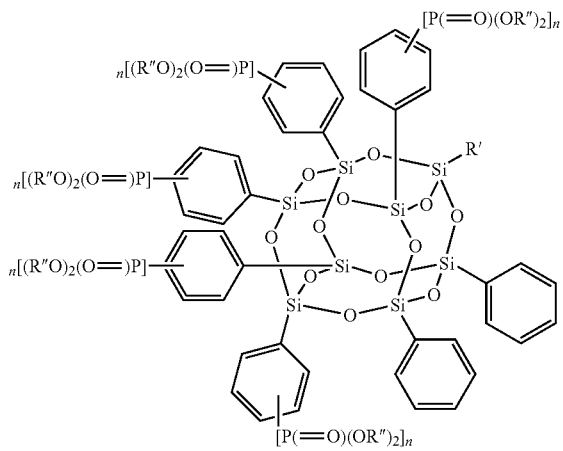

wherein in Formula 11, each n is independently 1 or 2;
R' is a substituted or unsubstituted $C_1$-$C_{20}$ alkyl group; and
R" is a substituted or unsubstituted $C_1$-$C_{20}$ alkyl group or a substituted or unsubstituted $C_6$-$C_{20}$ aryl group.

According to another aspect, a method of preparing a composite membrane, the method including: combining a compound including a cage-type structure of silsesquioxane in which a group represented by Formula 1C below is directly linked to at least one silicon atom of the silsesquioxane and a first solvent to obtain a composite membrane-forming composition;

Formula 1C

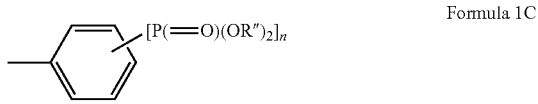

wherein in Formula 1C, n is 1 or 2; and
R" is a substituted or unsubstituted $C_1$-$C_{20}$ alkyl group or a substituted or unsubstituted $C_6$-$C_{20}$ aryl group,
coating the composite membrane-forming composition to form a film;
heat-treating the film to form a membrane; and
hydrolyzing the membrane to form a composite membrane including a composite, which is a reaction product of a composition including the compound described above.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
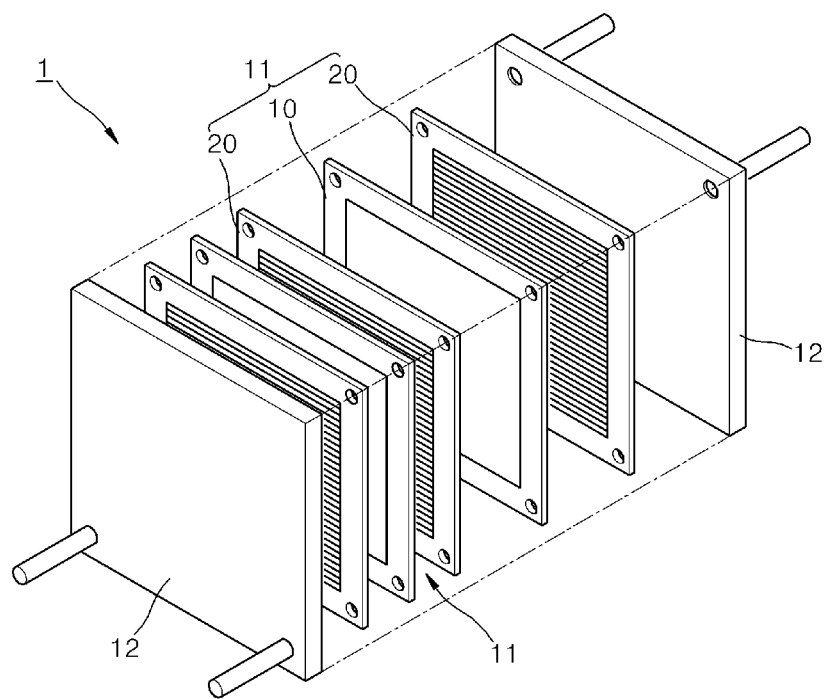
FIG. 1 is an exploded perspective view of a fuel cell according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

According to an embodiment, there is provided a compound including a cage-type structure of silsesquioxane in which a group represented by Formula 1 below or a salt thereof is directly linked to at least one silicon atom of the silsesquioxane:

Formula 1

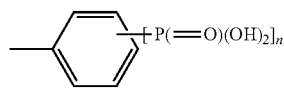

wherein in Formula 1, n is 1 or 2.

The group of Formula 1 may, for example, be a group represented by Formula 1A or 1B below, or a salt thereof:

Formula 1A

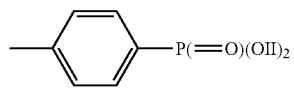

Formula 1B

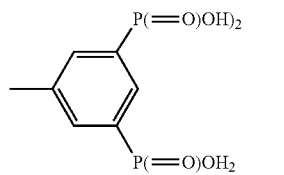

As used herein, a salt of Formula 1 or other formulas containing a —P(=O)(OH) moiety means that at least one hydrogen atom in the —P(=O)(OH) moiety is replaced by a monovalent counter ion. Counter ions for the salts are not particularly limited and can be an alkali metal such as $Li^+$, $Na^+$, $K^+$, or a combination comprising at least one of the foregoing. In some embodiments, at least one hydrogen atom but not all the hydrogen atoms are replaced by a counter ion.

A structure in which the group of Formula 1 or a salt thereof is directly linked to at least one silicon atom of the silsesquioxane may be (i) a structure in which the group of Formula 1 or a salt thereof is directly linked to all silicon atoms of the silsesquioxane; (ii) a structure in which the group of Formula 1 or a salt thereof is directly linked to at least one silicon atom of the silsesquioxane and a phenyl group is linked to the remaining silicon atoms; or (iii) a structure in which the group of Formula 1 or a salt thereof is directly linked to at least one silicon atom of the silsesquioxane and a phenyl group or a substituted or unsubstituted $C_1$-$C_{20}$ alkyl group is linked to each of the remaining silicon atoms of the cage-type structure of silsesquioxane.

As used herein, the term "directly linked" refers to a direct linkage between a silicon atom and the group of Formula 1 or a salt thereof without via a linker.

In a general polybenzimidazole electrolyte membrane, if the membrane contains a large amount of phosphoric acid, an ionic conductivity of the membrane is improved, but its mechanical properties may be deteriorated. Therefore, there is an urgent need to develop a material for forming an electrolyte membrane with high ionic conductivity and excellent mechanical properties.

Meanwhile, the compound described above having a structure in which the group of Formula 1 or a salt thereof is linked to at least one silicon atom of the cage-type structure of silsesquioxane has a plurality of phosphonic acid groups, and thus has an excellent proton transfer ability, whereby the compound has high ionic conductivity and excellent mechanical properties. In addition, even if a membrane including the compound contains phosphoric acid, mechanical properties of the membrane are not deteriorated. Thus, such a compound may be an excellent material for forming an electrolyte membrane, which can replace generally used polybenzimidazole.

Furthermore, if the compound has a —P(=O)(OH)$_2$ group at the terminal thereof, the compound may be maintained stable even in non-humidified conditions and may have improved conductivity at a high temperature of 100° C. or more, as compared to a case where the compound has other proton conducting groups such as a sulfonic acid (SO$_3$H) group at the terminal thereof. When a silsesquioxane compound having a sulfonic acid group at the terminal thereof is in non-humidified conditions, the sulfonic acid group provides a proton, thereby reducing the stability of the silsesquioxane compound. In addition, the silsesquioxane compound has a structure in which a phenyl group is directly linked to a silicon atom of the cage-type structure of silsesquioxane, and thus has higher thermal stability than that of silsesquioxane in which a silicon atom of the silsesquioxane and a phenyl group are linked to each other via a linker.

The cage-type structure of silsesquioxane may be, for example, polyhedral oligomeric silsesquioxane ("POSS"). The POSS has 8 silicon atoms and, as described above, may have a structure in which the group of Formula 1 or a salt thereof is directly linked to 1 to 8 silicon atoms of the POSS.

In an embodiment, the group of Formula 1 or a salt thereof may be directly linked to all the silicon atoms (i.e., 8 silicon atoms) of the POSS. Alternatively, the POSS may have a structure in which the group of Formula 1 or a salt thereof may be directly linked to at least one silicon atom of the POSS and a phenyl group is linked to the remaining silicon atoms. Non-limiting examples of the structure include a structure in which the group of Formula 1 or a salt thereof is directly linked to 5 of the 8 silicon atoms of the POSS and a phenyl group is directly linked to each of the remaining three silicon atoms. Also, non-limiting examples of the structure include a structure in which the group of Formula 1 or a salt thereof is directly linked to 4 or the 8 silicon atoms of the POSS, two of the groups of Formula 1 of a salt thereof are linked to 1 of the remaining four silicon atoms of the POSS, and a phenyl group is directly linked to each of the remaining three silicon atoms of the POSS.

In another embodiment, the POSS may have a structure in which the group of Formula 1 or a salt thereof is directly linked to at least one silicon atom of the POSS and a phenyl group or a substituted or unsubstituted $C_1$-$C_{20}$ alkyl group is linked to each of the remaining silicon atoms. As a non-limiting example, the POSS may have a structure in which the group of Formula 1 or a salt thereof is directly linked to 5 of the 8 silicon atoms of the POSS, a phenyl group is directly linked to each of the remaining two silicon atoms of the POSS, and an alkyl group such as an iso-octyl group is linked to the remaining silicon atom thereof.

The number of the groups of Formula 1 or a salt thereof in the POSS may be from 1 to 14, for example, from 5 to 14. For example, when having five of the groups of Formula 1 or a salt thereof, the POSS may have high ionic conductivity and thermal stability.

In the POSS, a distance between silicon atoms may be from about 0.1 to about 1.0 nanometers ("nm"), for example, about 0.5 nm, and a distance between the groups linked to the silicon atoms thereof may be from about 1.0 to about 2.0 nm, for example, about 1.5 nm. When the distance between silicon atoms and the distance between the groups linked to the silicon atoms is within the range described above, the compound may form a thermally and chemically robust hybrid framework.

When a $C_1$-$C_{20}$ alkyl group is linked to a silicon atom of the POSS, the alkyl group may act as a functional group involved in additional reactions of the compound, for example, a graft reaction and polymerization.

The group of Formula 1 or a salt thereof linked to a silicon atom of the POSS contributes to satisfactorily maintaining solubility of the compound and miscibility with other materials.

The compound including a cage-type structure of silsesquioxane in which the group of Formula 1 is directly linked to at least one silicon atom of the silsesquioxane may be at least one selected from Formulae 2 through 6 and 6A, or a salt thereof:

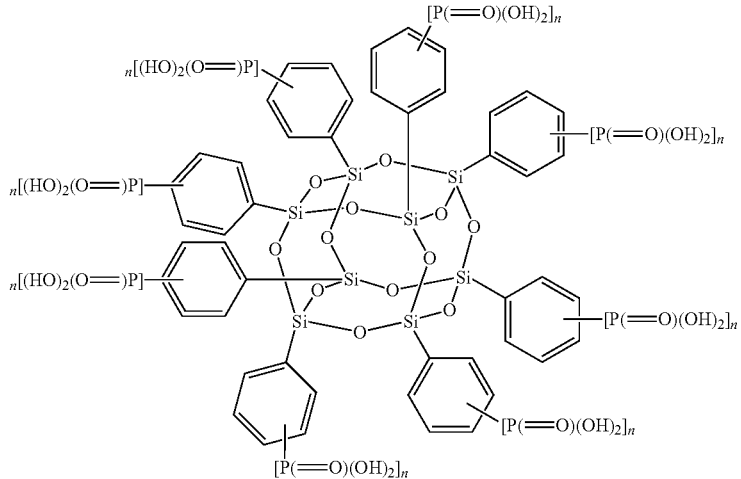

Formula 2 wherein in Formula 2, each n is independently 1 or 2,

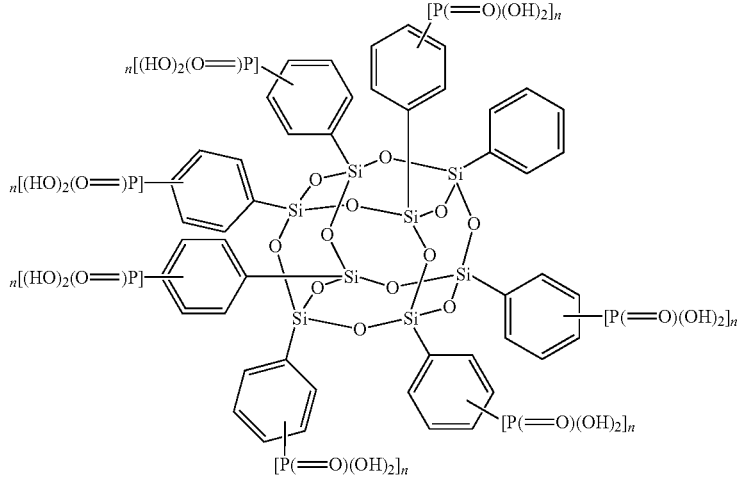

Formula 3 wherein in Formula 3, each n is independently 1 or 2,

Formula 4

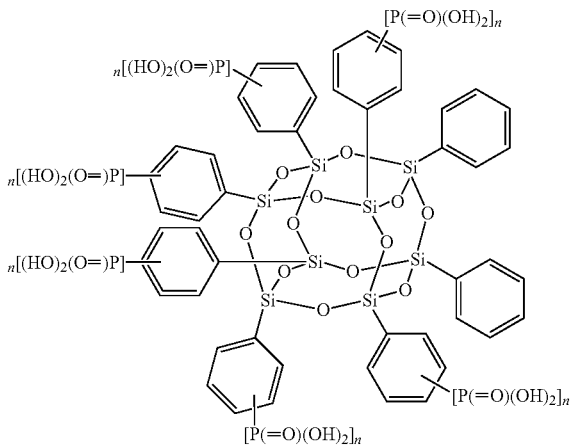

wherein in Formula 4, each n is independently 1 or 2,

Formula 5

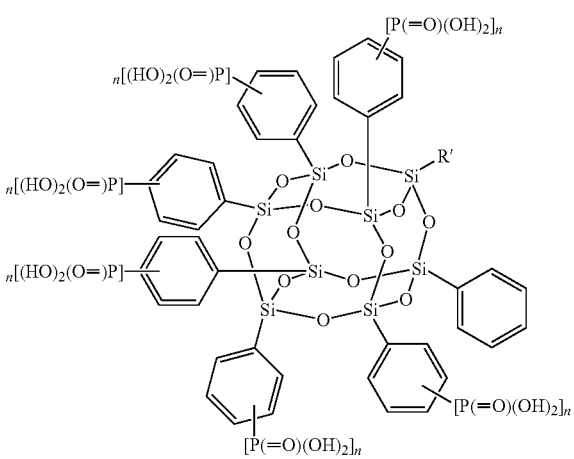

wherein in Formula 5, each n is independently 1 or 2,

Formula 6

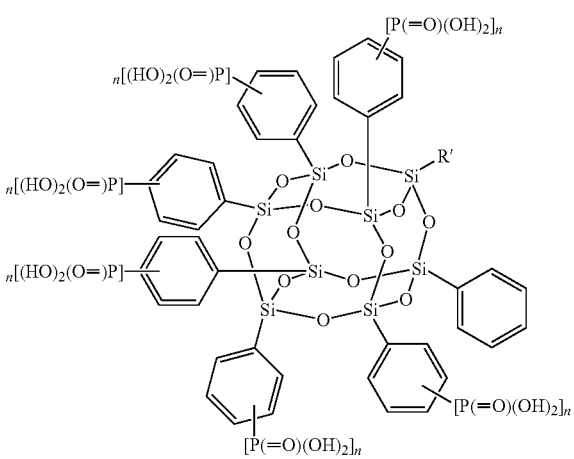

wherein in Formula 6, each n is independently 1 or 2,

R' is a substituted or unsubstituted $C_1$-$C_{20}$ alkyl group,

Formula 6A

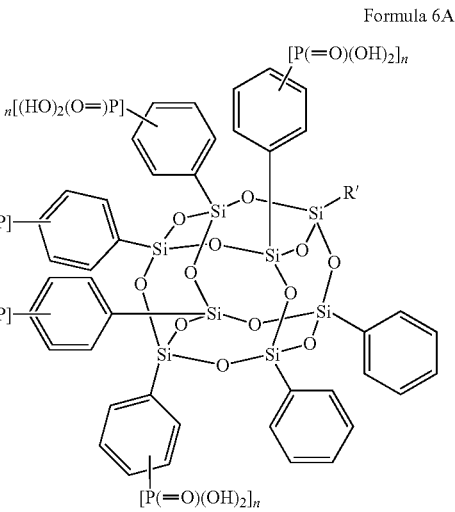

wherein in Formula 6A, each n is independently 1 or 2,
R' is a substituted or unsubstituted $C_1$-$C_{20}$ alkyl group.

In the Formulae 2-6 and 6A above, the group of Formula 1 or a salt thereof linked to the silicon atom of the silsesquioxane may be, for example, a group represented by Formula 1D or 1E or a salt thereof that has a structure in which a phosphonic acid group is linked to a para-position of a phenyl group:

Formula 1D

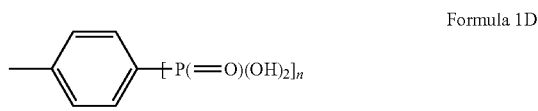

Formula 1E

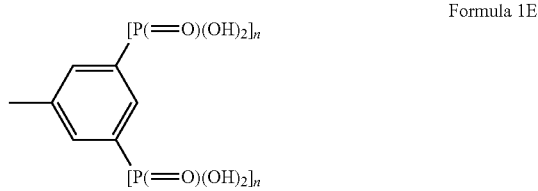

wherein, in Formulae 1 D each n is independently 1 or 2 and in Formula 1E, n is 1 or 2.

In Formulae 2-6 and 6A, R' may be methyl, ethyl, n-propyl, iso-propyl, n-pentyl, iso-pentyl, 1-(2,4,4-trimethylpentyl), n-octyl, or iso-octyl.

The compound including a cage-type structure of silsesquioxane in which the group of Formula 1 or a salt thereof is directly linked to at least one silicon atom of the silsesquioxane may be, for example, a compound represented by Formula 7 or 7A or a salt thereof:

Formula 7

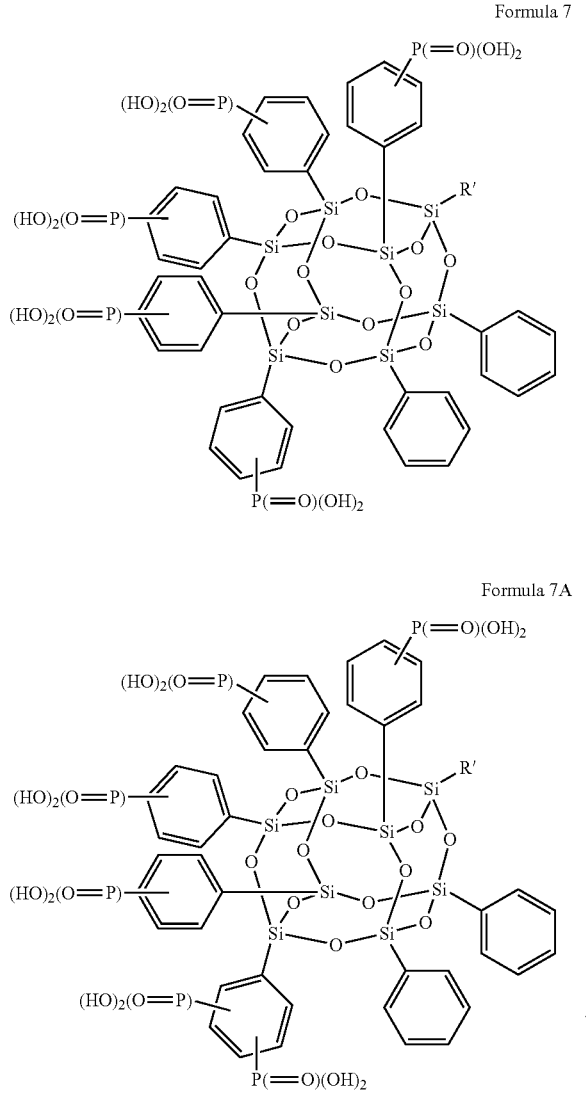

Formula 7A

In Formulae 7 and 7A, the group of Formula 1 or a salt thereof may be, for example, a group represented by Formula 1A or 1B that has a structure in which a phosphonic acid group is linked to a para-position of a phenyl group, or a salt thereof:

Formula 1A
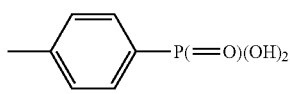

Formula 1B
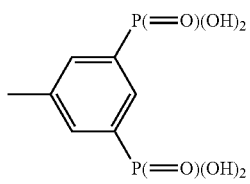

In Formulae 7 and 7A, R' may be methyl, ethyl, n-propyl, iso-propyl, n-pentyl, iso-pentyl, 1-(2,4,4-trimethylpentyl), n-octyl, or iso-octyl.

According to an embodiment, the compound including a cage-type structure of silsesquioxane in which the group of Formula 1 or a salt thereof is directly linked to at least one silicon atom of the silsesquioxane may be at least one selected from compounds represented by Formulae 8 through 10, or a salt thereof.

Formula 8

Formula 9

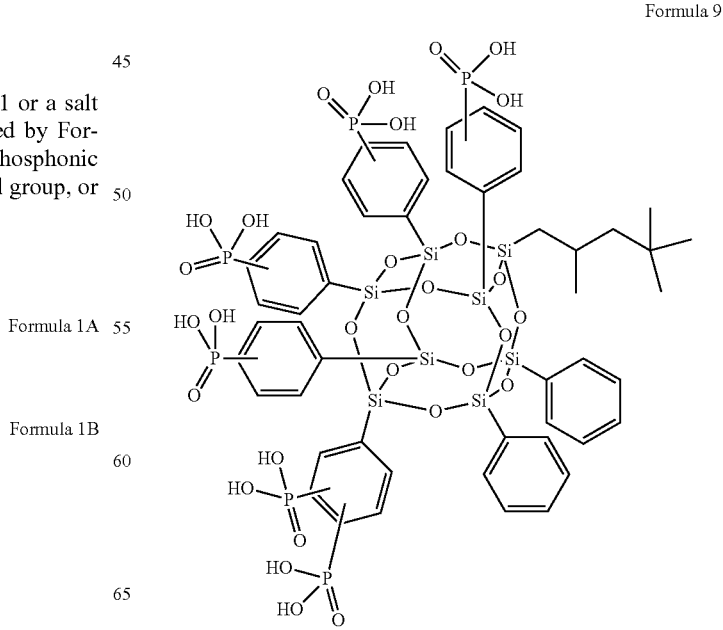

Formula 10

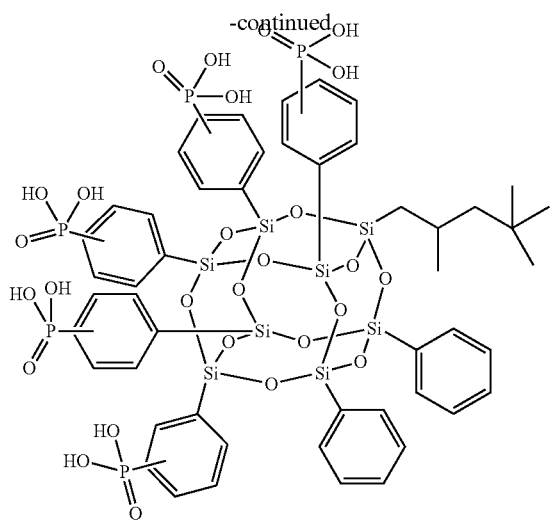

For example, the compounds of Formulae 8-10 may be compounds represented by Formulae 8A-10A below.

Formula 8A

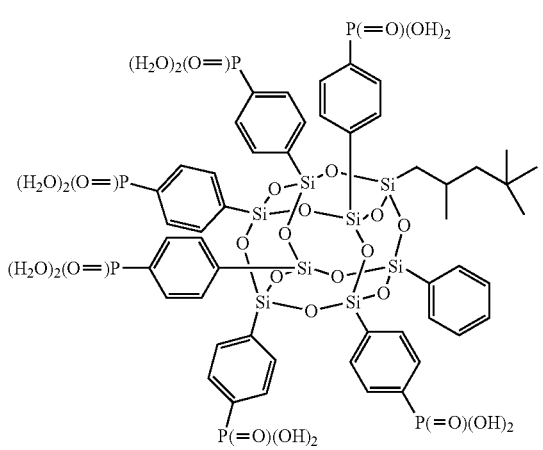

Formula 9A

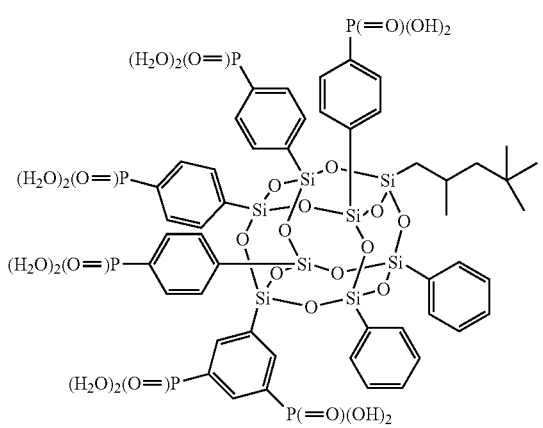

Formula 10A

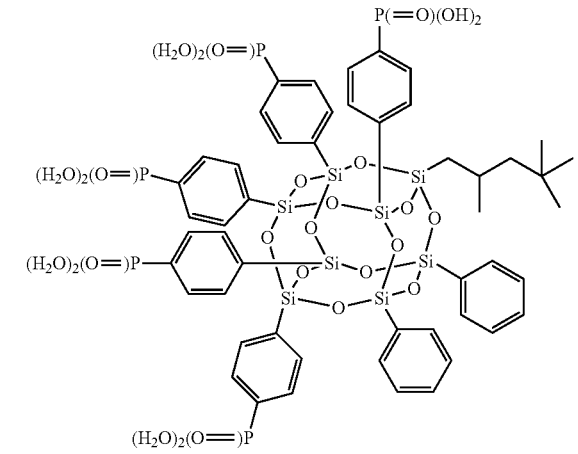

Hereinafter, a method of preparing a compound including a cage-type structure of silsesquioxane in which a group represented by Formula 1 or a salt thereof is directly linked to at least one silicon atom of the silsesquioxane will be described in detail. In this embodiment, a method of preparing a compound represented by Formula 6A below will be described. In this regard, the types of starting materials and the amounts and types of reagents used in each of a plurality of reactions may be adjusted to correspond to the structure of the compound including a cage-type structure of silsesquioxane in which a group represented by Formula 1 or a salt thereof is directly linked to at least one silicon atom of the silsesquioxane, thereby easily preparing the corresponding compound through synthesis processes that are identical or similar to those used to prepare the compound of Formula 6A and under reaction conditions that are identical or similar to those used to prepare the compound of Formula 6A:

Formula 1

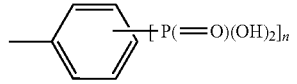

wherein in Formula 1, n is 1 or 2,

Formula 6A

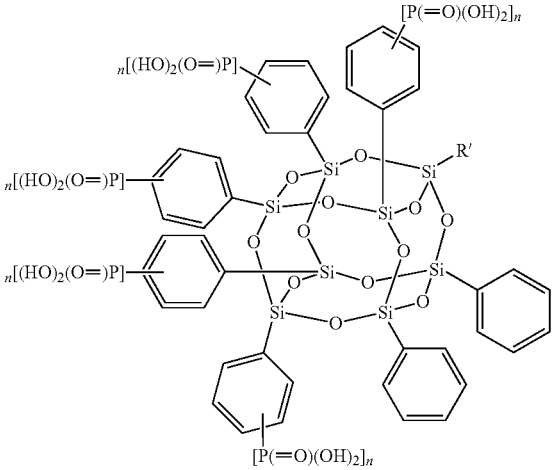

wherein in Formula 6A, each n is independently 1 or 2, R' is a substituted or unsubstituted $C_1$-$C_{20}$ alkyl group.

The compound of Formula 6A may be obtained by hydrolyzing a compound represented by Formula 11 below:

Formula 11

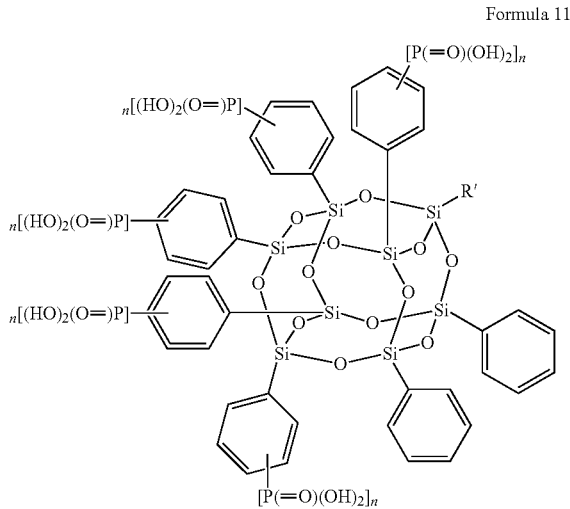

wherein in Formula 11, each n is independently 1 or 2,

R' is a substituted or unsubstituted $C_1$-$C_{20}$ alkyl group, and

R" is a substituted or unsubstituted $C_1$-$C_{20}$ alkyl group or a substituted or unsubstituted $C_6$-$C_{20}$ aryl group.

In Formula 11, R' may be methyl, ethyl, n-propyl, iso-propyl, n-pentyl, iso-pentyl, 1-(2,4,4-trimethylpentyl), n-octyl, or iso-octyl, and R" may be ethyl, phenyl, n-propyl, or methyl.

The hydrolyzing process may be performed by reflux of an acid solution of the compound. For example, the acid solution may be a hydrobromic acid (HBr) aqueous solution. The salt may be obtained by know ion-exchange procedures.

The compound of Formula 11 may be synthesized by a phosphonic ester substitution reaction of a compound represented by Formula 12 below:

Formula 12

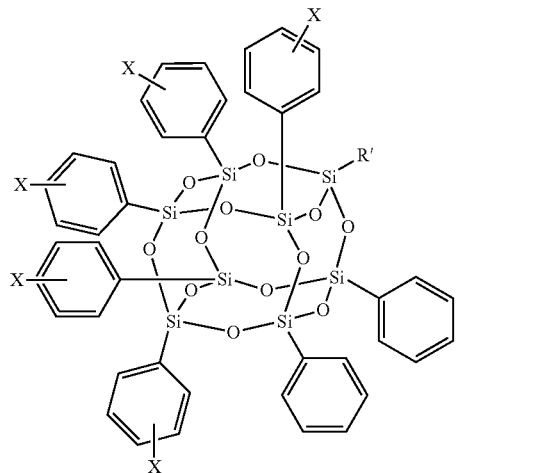

wherein in Formula 12, X is chlorine, bromine, or iodine, and

R' is a substituted or unsubstituted $C_1$-$C_{20}$ alkyl group.

In Formula 12, X may be, for example, bromine.

The phosphonic ester substitution reaction may be performed in the presence of, for example, a phosphite compound (e.g., $(R'''_2)(O=)P(OH)$ where R''' is a $C_1$-$C_{10}$ alkyl group or a $C_6$-$C_{10}$ aryl group), a base, and a palladium catalyst.

For example, the phosphite compound may be diethyl phosphite.

For example, the base may be triethylamine, pyridine, or the like, and the palladium catalyst may be tetrakis(triphenylphosphine)palladium ($Pd(PPh_3)_4$ wherein Ph is a phenyl group).

The amount of the phosphite compound may be in the range of about 5 to about 20 moles based on 1 mole of the compound of Formula 12. The amount of the palladium catalyst may be in the range of about 0.5 to about 3 moles based on 1 mole of the compound of Formula 12, and the base may be used in the same amount (in moles) as that of the phosphite compound. When the amounts of the phosphite compound, the base, and the palladium catalyst are within the ranges described above, the compound of Formula 11 may be prepared in a high yield.

The phosphonic ester substitution reaction may be performed in the presence of an organic solvent such as dimethylsulfoxide ("DMSO"), N,N'-dimethylformamide ("DMF"), or tetrahydrofuran ("THF").

The phosphonic ester substitution reaction may be performed at a temperature ranging from about 80 to about 100° C.

The compound of Formula 12 may be synthesized by halogenating a compound represented by Formula 13 below:

Formula 13

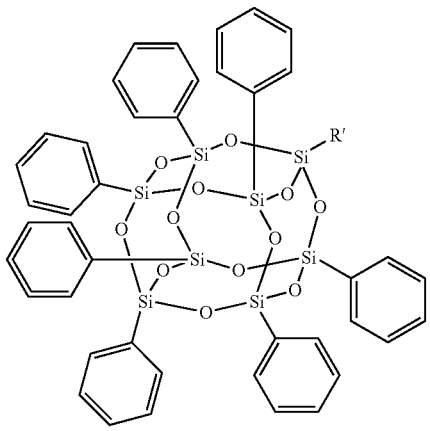

wherein in Formula 13, R' is a $C_1$-$C_{20}$ alkyl group or a $C_6$-$C_{20}$ aryl group.

In Formula 13, R' may be, for example, methyl, ethyl, n-propyl, iso-propyl, n-pentyl, iso-pentyl, 1-(2,4,4-trimethylpentyl), n-octyl, or iso-octyl.

The halogenating step may be performed using a halogenating agent, for example, bromine ($Br_2$). When a bromine substitution reaction using bromine is performed, a catalyst may be used to adjust the reactivity thereof. For example, the catalyst may be iron, or the like.

The bromine substitution reaction may be performed at room temperature (20-25° C.).

The compound of Formula 12 is commercially available or may be synthesized using one of various methods known in the art.

According to another embodiment, there is provided a composition including a compound that includes a cage-type structure of silsesquioxane in which a group represented by Formula 1 below or a salt thereof is directly linked to at least one silicon atom of the silsesquioxane:

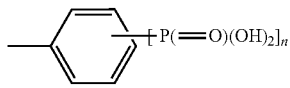

Formula 1 wherein in Formula 1, n is 1 or 2.

The composition may further include a conductive polymer.

The conductive polymer has high conductivity and excellent mechanical strength, and thus, a composite and composite membrane with improved conductivity and mechanical properties may be prepared using a composition including the conductive polymer.

In the composition, the amount of the compound including a cage-type structure of silsesquioxane may be in the range of about 1 to about 20 parts by weight, for example, from about 5 to about 10 parts by weight, based on 100 parts by weight of the total weight of the conductive polymer and the compound including a cage-type structure of silsesquioxane in which a group represented by Formula 1 or a salt thereof is directly linked to at least one silicon atom of the silsesquioxane.

When the amount of the compound including a cage-type structure of silsesquioxane in which a group represented by Formula 1 or a salt thereof is directly linked to at least one silicon atom of the silsesquioxane is within the range described above, a composite prepared using the composition and a composite membrane prepared using the composite may have high ionic conductivity and excellent physical properties.

The conductive polymer may be at least one selected from an azole-based polymer, polyimide, polyoxazole, and a sulfonated polymer.

When the azole-based polymer is used as a conductive polymer, the final product is a reaction product obtained as a result of a reaction between the compound and the azole-based polymer. For example, the reaction may be an acid-base reaction. In this regard, the azole-based polymer acts as a base.

According to another embodiment, there is provided a composite membrane using a composite, which is a reaction product of the composition.

The composite membrane has excellent mechanical strength and high durability. The composite membrane may be an electrolyte membrane, for example, an electrolyte membrane for a fuel cell.

The composite is a composite reaction product of the conductive polymer with the compound including a cage-type structure of silsesquioxane in which a group represented by Formula 1 or a salt thereof is directly linked to at least one silicon atom of the silsesquioxane. Thus, a composite membrane including the composite has high tensile strength and a high elongation ratio, and thus, exhibits improved mechanical properties and is easily processed. In addition, when the composite membrane is used as an electrolyte membrane, leakage of a phosphoric acid-based material from the electrolyte membrane is prevented and the conductivity of the electrolyte membrane is improved. Moreover, even if the composite membrane contains a phosphoric acid-based material, the mechanical properties of the composite membrane are not deteriorated. Thus, a fuel cell manufactured using the composite membrane as an electrolyte membrane may have high long-term durability and improved cell performances, for example, a cell voltage, and the like, because leakage of phosphoric acid from the composite membrane is prevented.

The reaction product may be, for example, a resultant reaction product between the compound including a cage-type structure of silsesquioxane in which a group represented by Formula 1 or a salt thereof is directly linked to at least one silicon atom of the silsesquioxane or the corresponding ester compound obtained therefrom and the conductive polymer through hydrogen bonding.

The tensile strength and elongation ratio of the composite membrane are maintained excellent even after the composite membrane is impregnated with a phosphoric acid-based material.

The fact that the composite is a composite reaction product of the conductive polymer and the compound including a cage-type structure of silsesquioxane in which a group represented by Formula 1 or a salt thereof is directly linked to at least one silicon atom of the silsesquioxane may be confirmed by spectroscopic data such as infrared spectrum.

A fuel cell including the composite membrane having the composition described above may have high durability and excellent cell performances due to an interaction between the compound and the azole-based polymer as a conductive polymer or an interaction between the compound and the sulfonated polymer as a conductive polymer.

The interaction may, for example, be an acid-base reaction between the azole-based polymer and the compound including a cage-type structure of silsesquioxane in which a group represented by Formula 1 or a salt thereof is directly linked to at least one silicon atom of the silsesquioxane and/or a reaction between the sulfonated polymer and the compound including a cage-type structure of silsesquioxane in which a group represented by Formula 1 or a salt thereof is directly linked to at least one silicon atom of the silsesquioxane.

When the sulfonated polymer is used as a conductive polymer, there is no need to use a phosphoric acid-based material as a proton conductor, unlike the case where the azole-based polymer is used as a conductive polymer. Without using the phosphoric acid-based material, a composite membrane with excellent mechanical properties such as conductivity and tensile strength may be prepared.

The composition may further include a phosphoric acid-based material.

For example, the phosphoric acid-based material may be phosphoric acid, polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$), metaphosphoric acid, or a derivative thereof. In particular, the phosphoric acid-based material may be phosphoric acid.

The amount of the phosphoric acid-based material may be in the range of about 1 to about 500 parts by weight based on 100 parts by weight of the compound including a cage-type structure of silsesquioxane in which a group represented by Formula 1 or a salt thereof is directly linked to at least one silicon atom of the silsesquioxane. When the phosphoric acid-based material is within the range described above, a composite membrane with high proton conductivity and excellent mechanical properties may be prepared even if it is doped with a small amount of the phosphoric acid-based material.

The azole-based polymer indicates a polymer in which a repeating unit includes at least one aryl ring having at least one nitrogen atom.

The aryl ring may have a structure in which a 5- or 6-membered ring containing 1 to 3 nitrogen atoms may be fused with another ring, for example, another aryl rings or heteroaryl rings. In this regard, the nitrogen atoms may be substituted with an oxygen atom, a phosphorus atom, and/or a sulfur atom. Examples of the aryl ring include phenyl, naphthyl, hexahydroindyl, indanyl, and tetrahydronaphthyl.

The azole-based polymer has at least one amino group in the repeating unit thereof as described above. In this regard, the amino group is a part of the aryl ring or a substituent part of an aryl unit, and may be a primary amino group, a secondary amino group, or a tertiary amino group.

The term "amino group" used herein refers to an amino group in which a nitrogen atom is covalently bound to at least one carbon or hetero atom. For example, the amino group contains —NH$_2$ and substituted moieties.

The term "amino group" used herein is understood to include an alkylamino group in which a nitrogen atom is bound to at least one additional alkyl group and an arylamino group and a diarylamino group in which a nitrogen atom is bound to at least one independently selected aryl group.

Methods of preparing an azole-based polymer and a polymer film including the azole-based polymer are disclosed in US 2005/256296.

The azole-based polymer may have one of the azole units represented by Formulae 14 to 27 below:

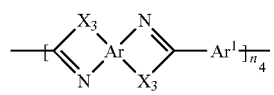

Formula 14

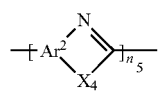

Formula 15

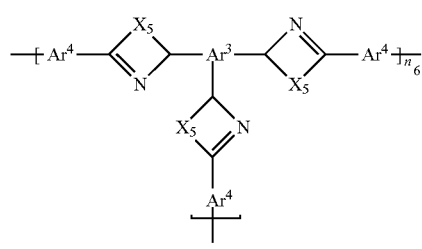

Formula 16

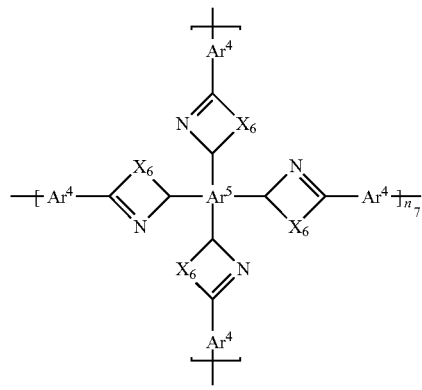

Formula 17

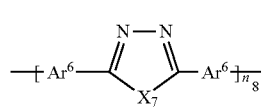

Formula 18

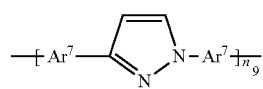

Formula 19

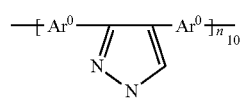

Formula 20

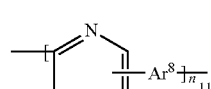

Formula 21

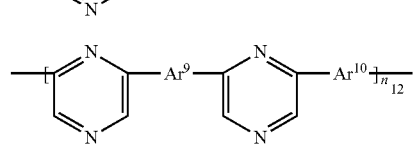

Formula 22

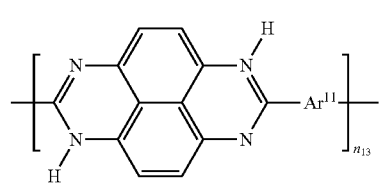

Formula 23

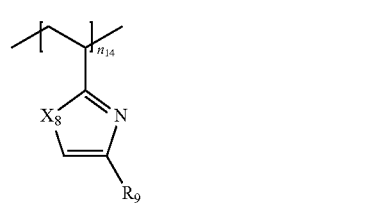

Formula 24

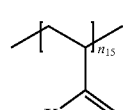

Formula 25

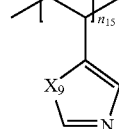

Formula 26

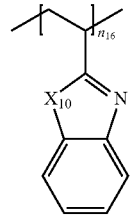

Formula 27

In Formulae 14 to 27, Ar$^0$ groups are identical to or different from each other and each independently a monocyclic or polycyclic C$_6$-C$_{20}$ aromatic group or a monocyclic or polycyclic C$_2$-C$_{20}$ heteroaromatic group; Ar groups are identical to or different from each other and each independently a monocyclic or polycyclic C$_6$-C$_{20}$ aromatic group or a monocyclic or polycyclic $C_2$-$C_{20}$ heteroaromatic group; $Ar^1$ groups are identical to or different from each other and each independently a monocyclic or polycyclic $C_6$-$C_{20}$ aromatic group or a monocyclic or polycyclic $C_2$-$C_{20}$ heteroaromatic group; $Ar^2$ groups are identical to or different from each other and each independently a monocyclic or polycyclic $C_6$-$C_{20}$ aromatic group or a monocyclic or polycyclic $C_2$-$C_{20}$ heteroaromatic group; $Ar^3$ groups are identical to or different from each other and each independently a monocyclic or polycyclic $C_6$-$C_{20}$ aromatic group or a monocyclic or polycyclic $C_2$-$C_{20}$ heteroaromatic group; $Ar^4$ groups are identical to or different from each other and each independently a monocyclic or polycyclic $C_6$-$C_{20}$ aromatic group or a monocyclic or polycyclic $C_2$-$C_{20}$ heteroaromatic group; $Ar^5$ groups are identical to or different from each other and each independently a monocyclic or polycyclic $C_6$-$C_{20}$ aromatic group or a monocyclic or polycyclic $C_2$-$C_{20}$ heteroaromatic group; $Ar^6$ groups are identical to or different from each other and each independently a monocyclic or polycyclic $C_6$-$C_{20}$ aromatic group or a monocyclic or polycyclic $C_2$-$C_{20}$ heteroaromatic group; $Ar^7$ groups are identical to or different from each other and each independently a monocyclic or polycyclic $C_6$-$C_{20}$ aromatic group or a monocyclic or polycyclic $C_2$-$C_{20}$ heteroaromatic group; $Ar^8$ groups are identical to or different from each other and each independently a monocyclic or polycyclic $C_6$-$C_{20}$ aromatic group or a monocyclic or polycyclic $C_2$-$C_{20}$ heteroaromatic group; $Ar^9$ groups are identical to or different from each other and each independently a monocyclic or polycyclic $C_6$-$C_{20}$ aromatic group or a monocyclic or polycyclic $C_2$-$C_{20}$ heteroaromatic group; $Ar^{10}$ groups are identical to or different from each other and each independently a monocyclic or polycyclic $C_6$-$C_{20}$ aromatic group or a monocyclic or polycyclic $C_2$-$C_{20}$ heteroaromatic group; $Ar^{11}$ groups are identical to or different from each other and each independently a monocyclic or polycyclic $C_6$-$C_{20}$ aromatic group or a monocyclic or polycyclic $C_2$-$C_{20}$ heteroaromatic group; $X_3$ through $X_{11}$ groups are identical to or different from each other and each independently oxygen, sulfur, or —N(R') where R' is hydrogen, a $C_1$-$C_{20}$ alkyl group, a $C_1$-$C_{20}$ alkoxy group, or a $C_6$-$C_{20}$ aryl group; $R_9$ groups are identical to or different from each other and each independently hydrogen, a $C_1$-$C_{20}$ alkyl group, or a $C_6$-$C_{20}$ aryl group; and $n_0$, $n_4$ through $n_{16}$, and $m_2$ are each independently an integer of 10 or more, for example, an integer of 100 or more, more for example, an integer ranging from 100 to 100,000.

Examples of the aromatic or heteroaromatic group include benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrrole, pyrazole, anthracene, benzopyrrole, benzotriazole, benzooxathiadiazole, benzooxadiazole, benzopyridine, benzopyrazidine, benzopyrimidine, benzotriazine, indolizine, quinolizine, pyridopyridine, imidazopyrimidine, pyrazinopyrimidine, carbazole, phenazine, benzoquinoline, phenoxazine, phenothiazine, benzopteridine, phenanthroline, and phenanthrene, each of which may have substituents.

$Ar^0$, $Ar^1$, $Ar^4$, $Ar^6$, $Ar^7$, $A^8$, $Ar^9$, $Ar^{10}$, and $Ar^{11}$ may have all possible substitution patterns. For example, if they are each a phenylene group, $Ar^1$, $Ar^4$, $Ar^6$, $Ar^7$, $A^8$, $Ar^9$, $Ar^{10}$, and $Ar^{11}$ may be each independently an ortho-phenylene group, a meta-phenylene group, or a para-phenylene group.

The alkyl group may, for example, be a single chain alkyl group having 1 to 4 carbon atoms, such as methyl, ethyl, n-propyl, i-propyl, and t-butyl. The aryl group may be a phenyl group or a naphthyl group.

Examples of the substituents include a halogen atom such as fluorine, an amino group, a hydroxyl group, and single chain alkyl groups such as methyl and ethyl.

Examples of the azole-based polymer include polyimidazole, polybenzothiazole, polybenzooxazole, polyoxadiazole, polyquinoxaline, polythiadiazole, polypyridine, polypyrimidine, and polytetraazapyrene.

The azole-based polymer may be a copolymer or blend including at least two units of Formulae 14 to 27. The azole-based polymer may be a block copolymer (for example, a diblock or triblock copolymer), a random copolymer, a periodic copolymer, or an alternating polymer, each of which includes at least two units of Formulae 14 to 27.

Alternatively, an azole-based polymer including only the unit of Formula 14 and/or 15 may be used.

The azole-based polymer may be one of the polymers represented by Formulae 28 to 54.

Formula 28

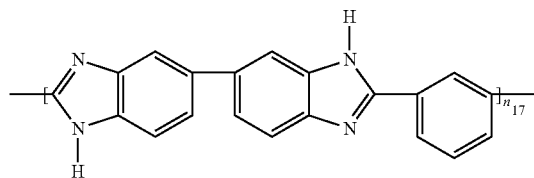

Formula 29

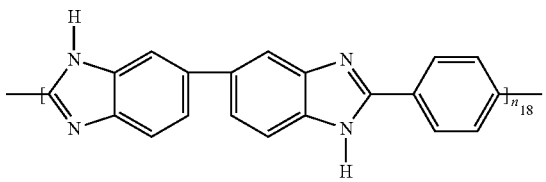

Formula 30

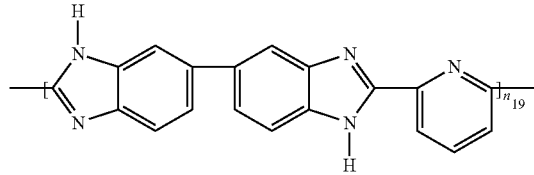

Formula 31

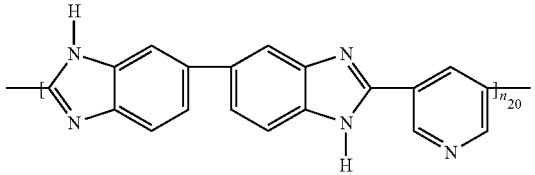

-continued
Formula 32
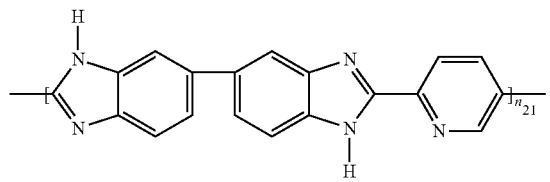
Formula 33
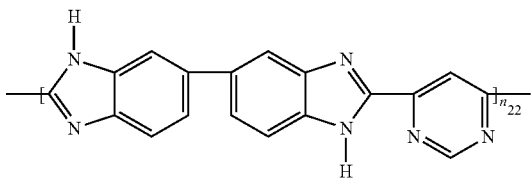
Formula 34
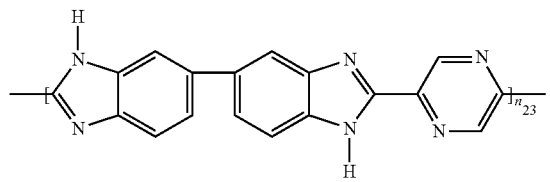
Formula 35
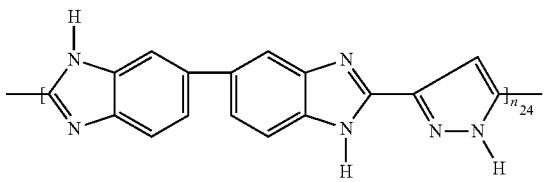
Formula 36
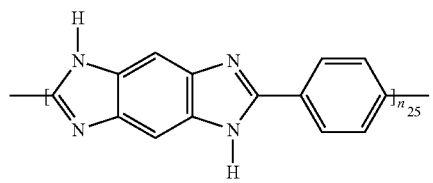
Formula 37
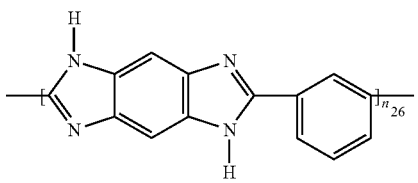
Formula 38
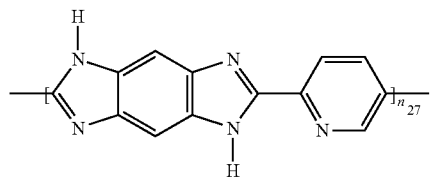
Formula 39
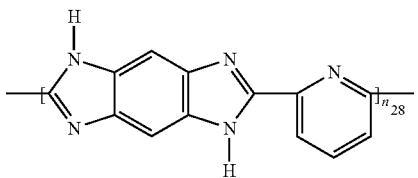
Formula 40
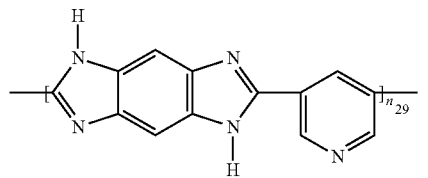
Formula 41
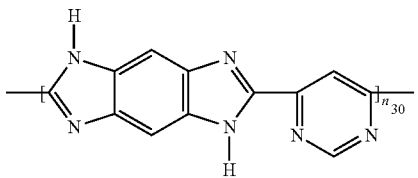
Formula 42
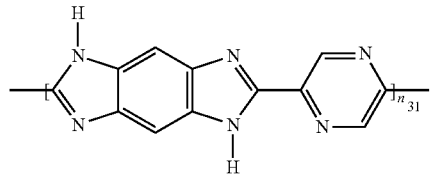
Formula 43
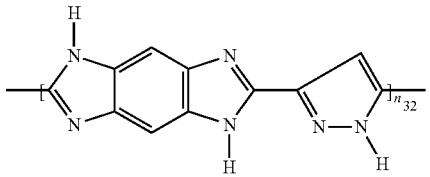
Formula 44
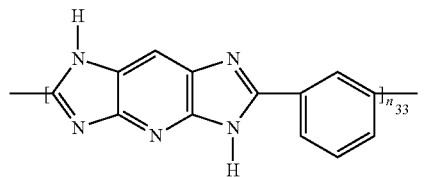
Formula 45
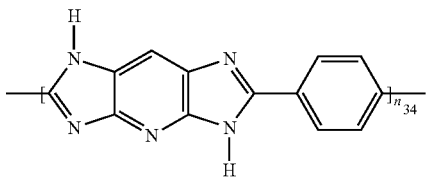
Formula 46
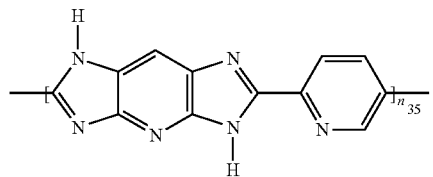
Formula 47
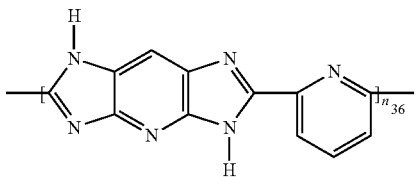

Formula 48
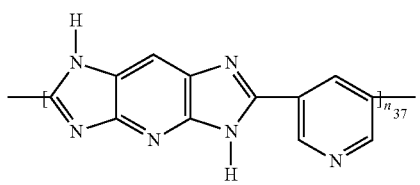

Formula 49
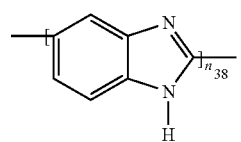

Formula 50
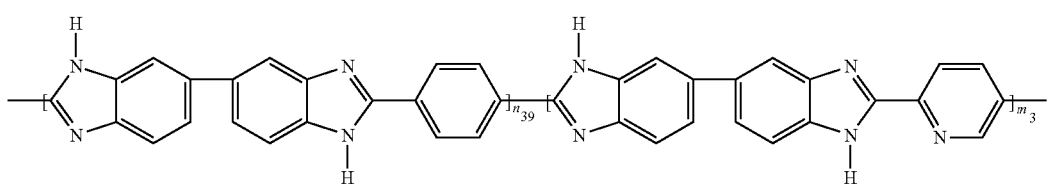

Formula 51
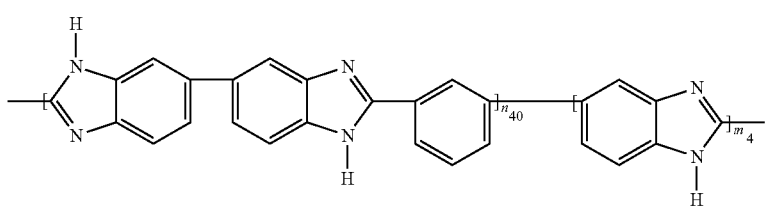

Formula 52
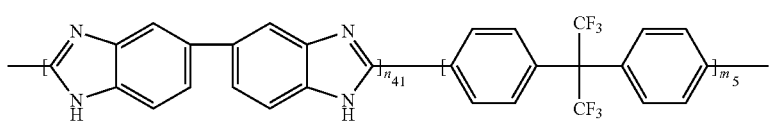

Formula 53
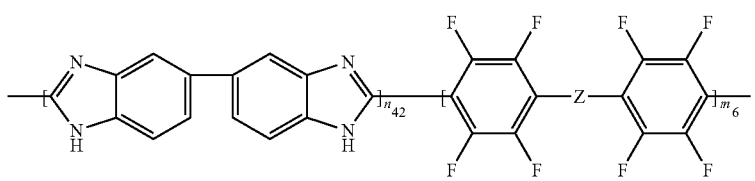

Formula 54
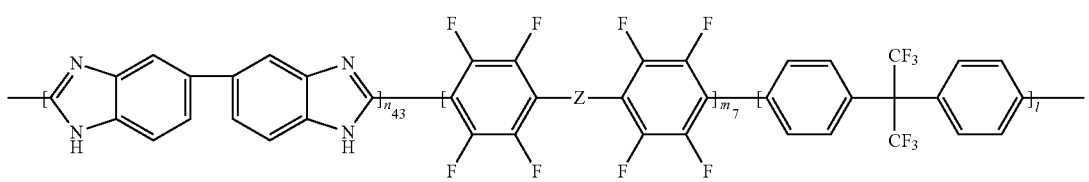

In Formulae 28 to 54, I, $n_{17}$ to $n_{43}$ and $m_3$ to $m_7$ may be each independently an integer of 10 or more, for example, an integer of 100 or more; z denotes a chemical bond or is —(CH$_2$)$_S$—, —C(=O)—, —SO$_2$—, —C(CH$_3$)$_2$—, or —C(CF$_3$)$_2$—; and s is an integer of from 1 to 5.

The azole-based polymer may be a compound having m-PBI represented by Formula 55 below or p-PBI represented by Formula 56 below:

Formula 55
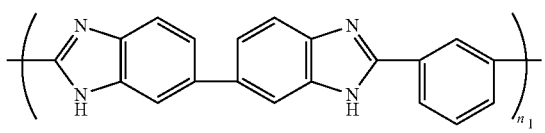

wherein in Formula 55, $n_1$ is an integer of 10 or more,

Formula 56
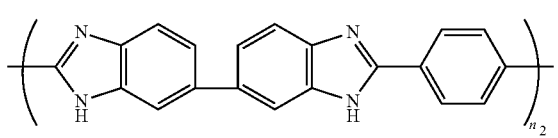

wherein in Formula 56, $n_2$ is an integer of 10 or more.

The polymer of Formula 55 or 56 may have a number average molecular weight of 1,000,000 or less.

The azole-based polymer may be a benzimidazole-based polymer represented by Formula 57 below:

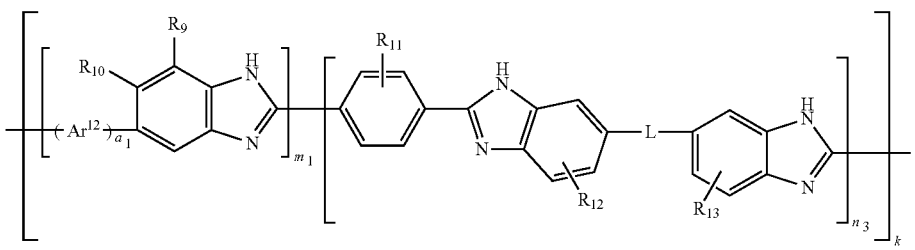

Formula 57 wherein in Formula 57, $R_9$ and $R_{10}$ are each independently hydrogen, a substituted or unsubstituted $C_1$-$C_{20}$ alkyl group, a substituted or unsubstituted $C_1$-$C_{20}$ alkoxy group, a substituted or unsubstituted $C_6$-$C_{20}$ aryl group, a substituted or unsubstituted $C_6$-$C_{20}$ aryloxy group, a substituted or unsubstituted $C_3$-$C_{20}$ heteroaryl group, or a substituted or unsubstituted $C_3$-$C_{20}$ heteroaryloxy group, wherein $R_9$ and $R_{10}$ may be linked to each other to form a $C_4$-$C_{20}$ carbocyclic group or a $C_3$-$C_{20}$ heterocyclic group;

$Ar^{12}$ is a substituted or unsubstituted $C_6$-$C_{20}$ arylene group or a substituted or unsubstituted $C_3$-$C_{20}$ heteroarylene group;

$R_{11}$ through $R_{13}$ are each independently mono- or multi-substituted substituent selected from the group consisting of hydrogen, a substituted or unsubstituted $C_1$-$C_{20}$ alkyl group, a substituted or unsubstituted $C_1$-$C_{20}$ alkoxy group, a substituted or unsubstituted $C_6$-$C_{20}$ aryl group, a substituted or unsubstituted $C_6$-$C_{20}$ aryloxy group, a substituted or unsubstituted $C_3$-$C_{20}$ heteroaryl group, and a substituted or unsubstituted $C_3$-$C_{20}$ heteroaryloxy group;

L denotes a linker;

$m_1$ is a number of from 0.01 to 1;

$a_1$ is 0 or 1;

$n_3$ is a number of from 0 to 0.99; and k is a number of from 10 to 250.

The benzimidazole-based polymer may be a compound represented by Formula 58 or 59:

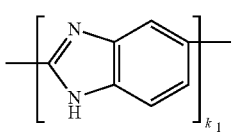

Formula 58 wherein in Formula 58, $k_1$ denotes a degree of polymerization and is a number of from 10 to 300,

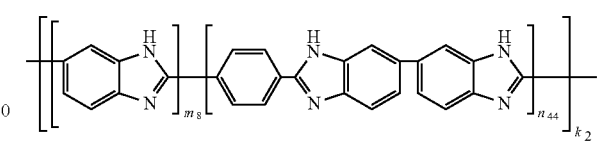

Formula 59 wherein in Formula 59, $m_8$ is a number of from 0.01 to 1, and $n_{44}$ is a number of from 0 to 0.99; and $k_2$ is a number of from 10 to 250.

In some embodiments, $m_a$ is 1, or a number from 0.1 to 0.9; and $n_{44}$ is 0 or a number from 0.1 to 0.9.

The azole-based polymer may be, for example, 2,5-polybenzimidazole, poly(2,2'-(m-phenylene)-5,5'-bibenzimidazole)("m-PBI"), or poly(2,2'-(p-phenylene)-5,5'-bibenzimidazole)("p-PBI").

The sulfonated polymer used as a conductive polymer may be at least one selected from the group consisting of sulfonated polyarylenesulfone, perfluorinated sulfonic acid group-containing polymer, and sulfonated polyarylene ether sulfone.

The sulfonated polymer may be a compound represented by Formula 60 below:

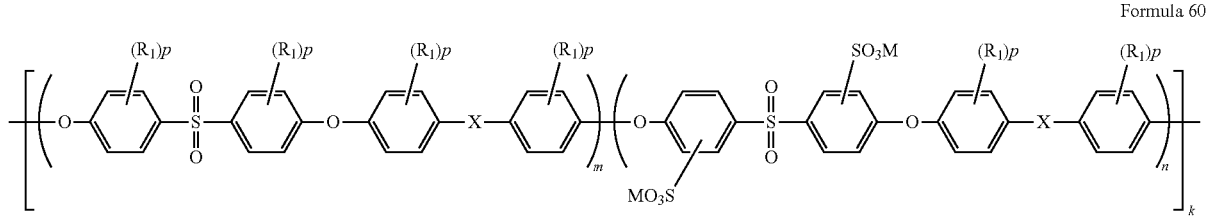

Formula 60 wherein in Formula 60, $R_1$ groups are identical to or different from each other and are each independently hydrogen, a $C_1$-$C_{10}$ alkyl group, a $C_2$-$C_{10}$ alkenyl group, a phenyl group, or a nitro group;

p is an integer of from 1 to 4;

X is a single bond, $-C(CF_3)_2-$, $-C(CH_3)_2-$, or $-PY'$ $(=O)-$ where Y' is H or $C_6H_6$;

M is Na, K, or H; and m is a real number of from 0.1 to 10, n is a real number of from 0.1 to 10, and k is a real number of from 5 to 500.

The sulfonated polymer may be a compound represented by Formula 61 below:

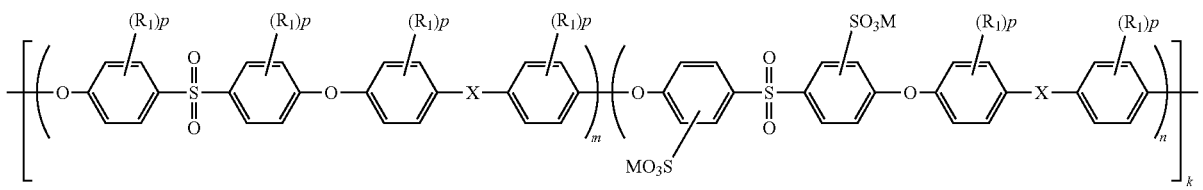

Formula 61 wherein in Formula 61, m is a real number of from 0.1 to 4, n is a real number of from 0.1 to 4, and k is a real number of from 5 to 500.

The composite membrane may further include a phosphoric acid-based material.

Examples of the phosphoric acid-based material include phosphoric acid, polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$), metaphosphoric acid, and derivatives thereof. In particular, the phosphoric acid-based material may be phosphoric acid.

The concentration of the phosphoric acid-based material may be in the range of about 80 to about 100 percent by weight ("wt %"), for example, about 85 wt %. The amount of the phosphoric acid-based material may be in the range of about 1 to about 500 parts by weight based on 100 parts by weight of the compound including a cage-type structure of silsesquioxane in which a group represented by Formula 1 or a salt thereof is directly linked to at least one silicon atom of the silsesquioxane. When the phosphoric acid-based material is within the range described above, a composite membrane with high proton conductivity and excellent mechanical properties may be prepared.

Hereinafter, a method of preparing a composite membrane by using the compound including a cage-type structure of silsesquioxane in which the group of Formula 1 or a salt thereof is directly linked to at least one silicon atom of the silsesquioxane will be described in detail.

First, a compound including a cage-type structure of silsesquioxane in which a group represented by Formula 1C below is directly linked to at least one silicon atom of the silsesquioxane and a solvent are mixed to prepare a composite membrane-forming composition. In this regard, the compound including a cage-type structure of silsesquioxane in which a group represented by Formula 1C below is directly linked to at least one silicon atom of the silsesquioxane is used as a starting material for forming a composite membrane because it has high solubility with respect to an organic solvent:

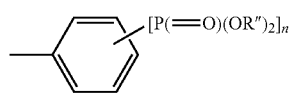

Formula 1C wherein in Formula 1C, n is 1 or 2, and
R" is a substituted or unsubstituted $C_1$-$C_{20}$ alkyl group or a substituted or unsubstituted $C_6$-$C_{20}$ aryl group.

A non-limiting example of the compound including a cage-type structure of silsesquioxane in which the group of Formula 1C is directly linked to at least one silicon atom of the silsesquioxane is a compound represented by Formula 11 below:

Formula 11

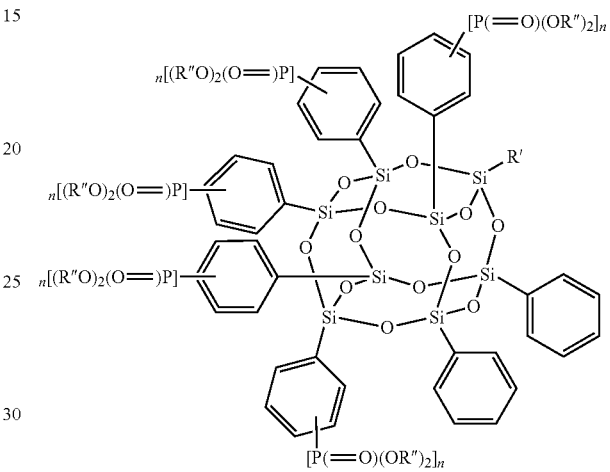

wherein in Formula 11, each n is independently 1 or 2,
R' is a substituted or unsubstituted $C_1$-$C_{20}$ alkyl group, and
R" is a substituted or unsubstituted $C_1$-$C_{20}$ alkyl group or a substituted or unsubstituted $C_6$-$C_{20}$ aryl group.

The composite membrane-forming composition is coated to form a film, and the film is heat treated to form a membrane.

Then, the membrane is hydrolyzed to form a composite membrane including a composite, which is a reaction product of the composition including the compound including a cage-type structure of silsesquioxane in which the group of Formula 1C is directly linked to at least one silicon atom of the silsesquioxane.

The composite membrane-forming composition may further include a conductive polymer. The conductive polymer may be at least one selected from an azole-based polymer, polyimide, polyoxazole, and a sulfonated polymer.

The heat treatment process may be performed at a temperature ranging from about 60 to about 120° C.

The hydrolyzing process is performed by refluxing using an acid solution. For example, the acid solution may be a hydrobromic acid (HBr) aqueous solution.

Also, the hydrolyzed structure may be dried and further impregnated with a phosphoric acid-based material.

The membrane impregnated with a phosphoric acid-based material is washed with distilled water to remove impurities remaining thereon and then is dried in vacuum.

The coating method of the composite membrane-forming composition is not particularly limited, and may be dipping, spray coating, screen printing, coating using a doctor blade, gravure coating, dip coating, roll coating, comma coating, silk screen, or a mixture thereof.

For example, the coating of the composite membrane-forming composition may be performed such that the composition is applied on a substrate, maintained at a predetermined temperature to uniformly spread the composition on the substrate, and then a coater such as a doctor blade is used to form a membrane with a desired thickness.

A mixing of the composition including a compound including a cage-type structure of silsesquioxane in which a group represented by Formula 1C below is directly linked to at least one silicon atom of the silsesquioxane and a conductive polymer is not particularly limited in terms of the adding order of each component and the use of a solvent therein:

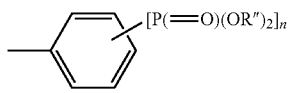

Formula 1C wherein in Formula 1C, n is 1 or 2, and
R" is a substituted or unsubstituted $C_1$-$C_{20}$ alkyl group or a substituted or unsubstituted $C_6$-$C_{20}$ aryl group.

In an embodiment of the mixing process, a conductive polymer, the compound, and a first solvent may be simultaneously mixed. Through such a mixing process, the constituents are uniformly dispersed or mixed in the composition and a composite membrane including the composition is excellent in workability.

Examples of the first solvent include tetrahydrofuran ("THF"), N-methylpyrrolidone ("NMP"), N,N'-dimethylacetamide ("DMAC"), and N,N'-dimethylformamide ("DMF").

The amount of the first solvent may be in the range of about 100 to about 1,000 parts by weight based on 100 parts by weight of the compound including a cage-type structure of silsesquioxane in which the group of Formula 1C is directly linked to at least one silicon atom of the silsesquioxane.

When the amount of the first solvent is within the range described above, the amount of solids in the composition is appropriately controlled, and thus the composition has an appropriate viscosity, which leads to excellent workability of a composite membrane including the composition.

According to an embodiment, the composition may be coated on a substrate and heat treated to form a membrane and the membrane is separated therefrom, thereby obtaining a composite membrane.

The heat treatment process may be performed at a temperature ranging from about 120 to about 160° C. When the heat treatment temperature is within the range described above, a composite membrane with high conductivity may be formed to a uniform thickness without a reduction in mechanical strength.

The substrate is not particularly limited, and may be one of various supports according to the manufacturing processes, for example, a glass plate, a release film, an anode, and the like.

Examples of the release film include a polytetrafluoroethylene film, a polyvinylidenefluoride film, a polyethyleneterephthalate film, and a biaxially stretched polyester film such as a Mylar film.

When the composite membrane is used as an electrolyte membrane, a phosphoric acid-based material may be supplied to the electrolyte membrane. In this regard, when the phosphoric acid-based material is supplied thereto, a reaction temperature may be in the range of about 30 to about 120° C., for example, about 60° C.

The supplying method of the phosphoric acid-based material to the electrolyte membrane is not particularly limited. For example, the electrolyte membrane may be immersed in the phosphoric acid-based material.

The obtained electrolyte membrane has a thickness ranging from about 1 to about 100 micrometers ("μm"), for example, from about 30 to about 90 μm. The composite membrane may be formed to a thin film thickness as described above.

The electrolyte membrane may be suitable for use in a fuel cell that includes a non-humidified type proton conductor and operates at middle and high temperatures under non-humidified conditions. In this regard, the middle and high temperatures are not particularly limited, for example, from about 120 to about 400° C.

The composite membrane as an electrolyte membrane is interposed between a cathode and an anode, thereby completing the manufacture of a fuel cell. The fuel cell has high proton conductivity, excellent lifetime characteristics, and high efficiency, at high temperatures under non-humidified conditions.

The use of the fuel cell is not particularly limited. For example, the fuel cell may be a solid oxide fuel cell, a proton exchange membrane fuel cell, or the like.

Figure 2:
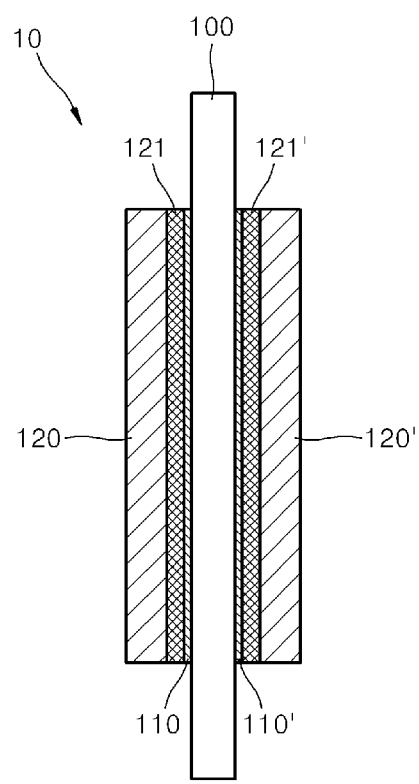
FIG. 2 is a cross-sectional view of a membrane-electrode assembly ("MEA") of the fuel cell of FIG. 1, according to an embodiment.

FIG. 1 is an exploded perspective view of a fuel cell 1 according to an embodiment, and FIG. 2 is a cross-sectional view of a MEA 10 of the fuel cell 1 of FIG. 1, according to an embodiment.

Referring to FIG. 1, the fuel cell 1 includes two unit cells 11 that are interposed between a pair of holders 12. Each of the unit cells 11 includes an MEA 10 and bipolar plates 20 disposed on both sides of the MEA 10 in a thickness direction of the MEA 10. The bipolar plates 20 may each include conductive metal or carbon and may each contact the MEA 10, so that the bipolar plates 20 function as a current collector and supply oxygen and a fuel to a catalyst layer of the MEA 10.

In FIG. 1, the fuel cell 1 includes two unit cells 11, but the number of unit cells is not limited thereto. For example, the number of the unit cells 11 may be tens to hundreds according to characteristics required for a fuel cell.

Referring to FIG. 2, the MEA 10 includes an electrolyte membrane 100; catalyst layers 110 and 110' that are disposed on both sides of the electrolyte membrane 100 in a thickness direction thereof; first gas diffusion layers 121 and 121' that are respectively disposed on the catalyst layers 110 and 110'; and second gas diffusion layers 120 and 120' that are respectively disposed on the first gas diffusion layers 121 and 121'.

A composite membrane according to an embodiment is employed as the electrolyte membrane 100.

The catalyst layers 110 and 110' may function as a fuel electrode and an oxygen electrode, each of which includes a catalyst and a binder, and may further include a material that increases an electrochemical surface area of the catalyst.

The catalyst layer may include a composition according to an embodiment or a reaction product thereof, i.e., a composite.

The first gas diffusion layers 121 and 121' and the second gas diffusion layers 120 and 120' may each include, for example, carbon sheet, carbon paper, or the like, and may diffuse oxygen and a fuel supplied through the bipolar plates 20 to entire surfaces of the catalyst layers 110 and 110'.

The fuel cell 1 including the MEA 10 operates at a temperature of about 120° C. to about 400° C. A fuel, for example, hydrogen is supplied to the catalyst through the bipolar plate 20 and an oxidizing agent, for example, oxygen is supplied to the catalyst layer 110' through the bipolar plate 20. Also, at one of the catalyst layers 110 and 110', hydrogen is oxidized to generate a hydrogen ion (H$^+$) and then the hydrogen ion (H$^+$) conducts the electrolyte membrane 100 and reaches the other thereof, and at the other of the catalyst layers 110 and 110', the hydrogen ion (H$^+$) electrochemically reacts with oxygen to generate water (H$_2$O) and electric energy. Also, the hydrogen supplied as a fuel may be a hydrogen that is generated by reforming hydrocarbon or alcohol, and the oxygen supplied as an oxidizing agent may be supplied with air.

Hereinafter, a method of manufacturing a fuel cell using the electrolyte membrane will be described in detail.

An electrode for a fuel cell includes a catalyst layer including a catalyst and a binder.

The catalyst may be platinum (Pt), or an alloy or a mixture of platinum (Pt) and at least one metal selected from the group consisting of gold (Au), palladium (Pd), rhodium (Ru), iridium (Ir), ruthenium (Ru), tin (Sn), molybdenum (Mo), cobalt (Co), and chromium (Cr). The catalyst metal may be supported on a carbonaceous support. For another example, the catalyst may be at least one metal selected from the group consisting of Pt, a PtCo alloy, and a PtRu alloy. The catalyst metal may be supported on a carbonaceous support.

The binder may be at least one selected from the group consisting of poly(vinylidenefluoride), polytetrafluoroethylene, and a tetrafluoroethylene-hexafluoropropylene copolymer, and the amount of the binder may be in the range of about 0.001 to about 0.5 parts by weight based on 1 part by weight of the catalyst. When the amount of the binder is within this range, the catalyst layer has a high adhesive strength with respect to the support.

A composite membrane including the composite, which is a reaction product of a composition including a compound including a cage-type structure of silsesquioxane in which a group represented by Formula 1 or a salt thereof is directly linked to at least one silicon atom of the silsesquioxane may be interposed between the electrodes, thereby completing the manufacture of the fuel cell:

Formula 1

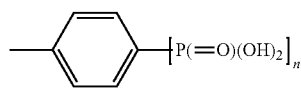

wherein in Formula 1, n is 1 or 2.

The composition may include the aforementioned conductive polymer.

When a sulfonated polymer is used as the conductive polymer, the impregnating of the composite membrane with a phosphoric acid-based material is not needed.

Meanwhile, the compound including a cage-type structure of silsesquioxane in which the group of Formula 1 or a salt thereof is directly linked to at least one silicon atom of the silsesquioxane, a composition including the composition, or a composite, which is a reaction product of the composition, may be used as an ionomer when used to manufacture an electrode:

Formula 1

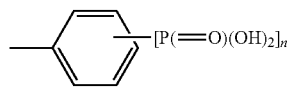

wherein in Formula 1, n is 1 or 2.

In an electrode manufactured using the compound, the leakage of a phosphoric acid-based material in the electrodes to the outside may be efficiently prevented, and gas permeation properties may be improved due to the characteristics of the case-type structure of silsesquioxane.

The composition may include the conductive polymer described above.

In an embodiment of a method of manufacturing an electrode, a catalyst is dispersed in a second solvent to prepare a dispersion.

For example, the second solvent may be N-methylpyrrolidone ("NMP") or N,N'-dimethylacetamide ("DMAc"), and the amount of the second solvent may be in the range of about 100 to about 1,000 parts by weight based on 100 parts by weight of the catalyst.

Then, the compound is added to the dispersion and mixed together, and the mixture is stirred to obtain a catalyst layer-forming composition. The mixture may further include a binder.

The catalyst layer-forming composition may further include a conductive polymer.

The catalyst layer-forming composition is coated on a carbon support, thereby completing the manufacture of the electrode. In this regard, the carbon support is fixed on a glass substrate so that the coating process can be easily performed. The coating method is not particularly limited, and may be coating using a doctor blade, bar coating, screen printing, or the like.

After the coating process, the catalyst layer-forming composition is heat treated at a temperature ranging from about 20 to about 150° C.

The finally obtained electrode for a fuel cell may include the compound including a cage-type structure of silsesquioxane in which the group of Formula 1 or a salt thereof is directly linked to at least one silicon atom of the silsesquioxane, a composition including the compound, or a composite, which is a reaction product of the composition. Alternatively, during the heat treatment process and/or a fuel cell including the electrodes operates, a reaction between the conductive polymer and the compound including a cage-type structure of silsesquioxane in which the group of Formula 1 or a salt thereof is directly linked to at least one silicon atom of the silsesquioxane occurs, and thus the fuel cell may include a composite formed therefrom.

Substituents in the formulae above may be defined as follows.

As used herein, the term "alkyl" refers to a fully saturated branched or unbranched (or straight chain or linear) hydrocarbon group.

Examples of the alkyl group include, but are not limited to, methyl, ethyl, n-propyl, iso-propyl, n-butyl, iso-butyl, sec-butyl, n-pentyl, iso-pentyl, neo-pentyl, n-hexyl, 3-methylhexyl, 2,2-dimethylpentyl, 2,3-dimethylpentyl, 1-(2,4,4-trimethylpentyl), and n-heptyl.

At least one hydrogen atom of the alkyl group may be substituted with a halogen atom, a $C_1$-$C_{20}$ alkyl group substituted with a halogen atom (for example, —CF$_3$, —CHF$_2$, —CH$_2$F and —CCl$_3$), a $C_1$-$C_{20}$ alkoxy group, a $C_2$-$C_{20}$ alkoxyalkyl group, a hydroxy group, a nitro group, a cyano group, an amino group, an amidino group, hydrazine, hydrazone, a carboxyl group or a salt thereof, a sulfonyl group, a sulfamoyl, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, or a $C_6$-$C_{20}$ heteroarylalkyl group.

As used herein, the term "halogen atom" refers to fluoro, bromo, chloro, or iodo.

As used herein, the term "a $C_1$-$C_{20}$ alkyl group substituted with a halogen atom" refers to a $C_1$-$C_{20}$ alkyl group that is substituted with one or more halo groups, and unlimited examples of a $C_1$-$C_{20}$ alkyl group that is substituted with one or more halo groups are monohaloalkyl, dihaloalkyl, and polyhaloalkyl including perhaloalkyl.

A monohaloalkyl has one iodo, bromo, chloro or fluoro within the alkyl group, and dihaloalkyl and polyhaloalkyl groups have two or more of the same halo atoms or a combination of different halo groups within the alkyl.

As used herein, the term "alkoxy" refers to alkyl-O—, wherein alkyl is defined herein above. Examples of alkoxy include, but are not limited to, methoxy, ethoxy, propoxy, 2-propoxy, butoxy, tert-butoxy, pentyloxy, hexyloxy, cyclopropyloxy, cyclohexyloxy and the like. At least one hydrogen atom of the alkoxy group may be substituted with the same substituent as described above in connection with the alkyl group.

The term "alkoxyalkyl" refers to an alkyl group, as defined above, in which the alkyl group is substituted with an alkoxy group. At least one hydrogen atom of the alkoxyalkyl group may be substituted with the same substituent as described above in connection with the alkyl group. The term "alkoxyalkyl" used herein includes a substituted alkoxyalkyl moiety.

The term "alkenyl" refers to a branched or unbranched hydrocarbon having at least one carbon-carbon double bond. Examples of alkenyl are, but are not limited to, vinyl, allyl, butenyl, iso-propenyl or iso-butenyl. At least one hydrogen atom of the alkenyl group may be substituted with the same substituent as described above in connection with the alkyl group.

The term "alkynyl" refers to a branched or unbranched hydrocarbon having at least one carbon-carbon triple bond. Examples of alkynyl are, but are not limited to, ethynyl, n-butynyl, iso-butynyl or iso-propynyl.

At least one hydrogen atom of the alkynyl group may be substituted with the same substituent as described above in connection with the alkyl group.

The term "aryl" is used alone or in combination, and refers to an aromatic hydrocarbon group having one or more rings.

The term "aryl" also refers to a group in which an aromatic ring is fused to one or more cycloalkyl rings.

Examples of an aryl group are, but are not limited to, phenyl, naphthyl, or tetrahydronaphthyl.

At least one hydrogen atom of the aryl group may be substituted with the same substituent as described above in connection with the alkyl group.

The term "arylalkyl" is an alkyl group substituted with an aryl group. Examples of an arylalkyl group are benzyl or phenyl-$CH_2CH_2$—.

The term "aryloxy" includes an —O-aryl group, wherein aryl is defined herein. Examples of an aryloxy group are a phenoxy group and the like. At least one hydrogen atom of the aryloxy group may be substituted with the same substituent as described above in connection with the alkyl group.

The term "heteroaryl" refers to a monocyclic or bicyclic organic compound that contains one or more hetero atoms selected from N, O, P, and S, and the remaining ring atoms are carton atoms. The heteroaryl group may include, for example, 1 to 5 hetero atoms, and 5 to 10 ring members. S or N may be oxidized to various oxidation states.

Typical monocyclic heteroaryl groups include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2yl, pyrazin-4-yl, pyrazin-5-yl, 2-pyrimidin-2-yl, 4-pyrimidin-2-yl, and 5-pyrimidin-2-yl.

The term "heteroaryl" also refer to a group in which a heteroaromatic ring is fused to one or more aryl, cycloaliphatic, or heterocyclic rings.

Examples of bicyclic heteroaryl include indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoqinolinyl, thieno[2,3-b]furanyl, furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, (pyrrolo[1,2-b]pyridazinyl, imidazo[1,2-c]pyrimidinyl, pyrido[3,2-d]pyrimidinyl, pyrido[4, 3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4, 5-d]pyrimidinyl.

At least one hydrogen atom in the heteroaryl group may be substituted with the same substituent as described above in connection with the alkyl group.

The term "heteroarylakyl" refers to an alkyl group substituted with a heteroaryl group.

The term "heteroaryloxy" includes a —O-heteroaryl moiety. At least one hydrogen atom in a heteroaryloxy group may be substituted with the same substituent as described above in connection with the alkyl group.

The term "heteraryloxyalkyl" refers to an alkyl group that is substituted with a heteroaryloxy group. At least one hydrogen atom in heteraryloxyalkyl may be substituted with the same substituent as described above in connection with the alkyl group.

As used herein, the term "carbocyclic" refers to saturated or partially unsaturated but non-aromatic monocyclic, bicyclic or tricyclic hydrocarbon groups.

Exemplary monocyclic hydrocarbon groups include cyclopentyl, cyclopentenyl, cyclohexyl and cyclohexenyl.

Exemplary bicyclic hydrocarbon groups include bornyl, decahydronaphthyl, bicyclo[2.1.1]hexyl, bicyclo[2.2.1]heptyl, bicyclo[2.2.1]heptenyl, and bicyclo[2.2.2]octyl.

Exemplary tricyclic hydrocarbon groups include adamantyl.

At least one hydrogen atom in a carbocyclic group may be substituted with the same substituent as described above in connection with the alkyl group.

The term "heterocyclic" refers to a ring containing 5-10 ring atoms including a hetero atom such as N, S, P, or O, and an example of a heterocyclic group is pyridyl. At least one hydrogen atom in a heterocyclic group may be substituted with the same substituent as described above in connection with the alkyl group.

The term "heterocyclicoxy" includes a —O-heterocyclic group, and at least one hydrogen atom in a heterocyclicoxy group may be substituted with the same substituent as described above in connection with the alkyl group.

The term "sulfonyl" includes R"—$SO_2$—, wherein R" is hydrogen, alkyl, aryl, heteroaryl, aryl-alkyl, heteroaryl-alkyl, alkoxy, aryloxy, cycloalkyl, or heterocycle.

The term "sulfamoyl" includes $H_2NS(O_2)$—, alkyl-NHS$(O_2)$—, (alkyl)$_2$NS$(O_2)$-aryl-NHS$(O_2)$—, alkyl(aryl)-NS$(O_2)$—, (aryl)$_2$NS$(O_2)$—, heteroaryl-NHS(O)$_2$—, (aryl-alkyl)-NHS$(O_2)$—, or (heteroaryl-alkyl)-NHS$(O_2)$—.

At least one hydrogen atom in sulfamoyl may be substituted with the same substituent as described above in connection with the alkyl group.

The term "amino" includes compounds where a nitrogen atom is covalently bonded to at least one carbon or heteroatom. The term "amino" also includes —$NH_2$ and also includes substituted moieties.

The term "alkyl amino" includes alkyl amino wherein the nitrogen is bound to at least one additional alkyl group. The term "alkyl amino" also includes "arylamino" and "diarylamino" groups wherein the nitrogen is bound to at least one or two independently selected aryl groups, respectively.

The term "aromatic" includes a cyclic hydrocarbon with alternating carbon and single bonds between carbon atoms.

The term "heteroaromatic" includes an aromatic hydrocarbon wherein at least one of the carbon atoms is replaced with a heteroatom.

One or more embodiments will now be described in further detail with reference to the following examples. These examples are only for illustrative purposes and not intended to limit the purpose and scope of one or more embodiments.

Preparation Example 1

Synthesis of Polyhedral Oligomeric Silsesquioxane ("POSS")

1) Bromine Substitution Reaction

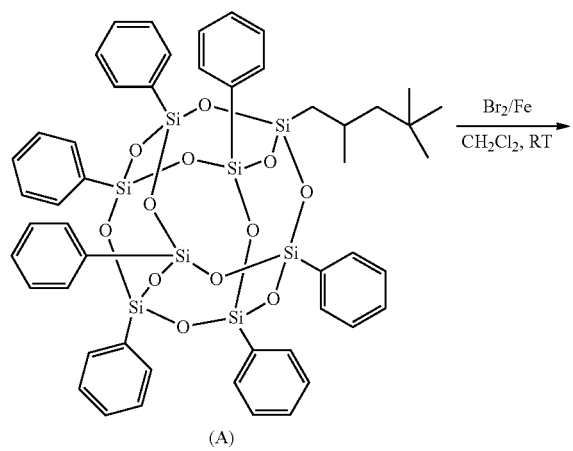

(A)

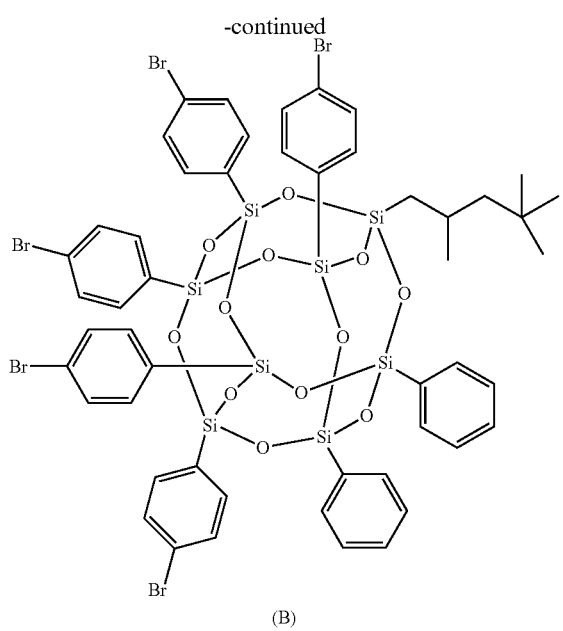

(B)

10 g of iso-octylphenyl POSS (A), 1.1 g of iron (Fe), and 2.4 ml (5 equivalent weights) of bromine ($Br_2$) water were added to 100 ml of methylene chloride ($CH_2Cl_2$) and the resultant solution was stirred at room temperature for 3 hours. In this experiment, the bromine water was slowly added dropwise to prepare a reaction mixture.

The reaction mixture was stirred for 3 hours, and then subjected to fractional purification once with 500 ml of 10 wt % sodium hydrogen sulfite ($NaHSO_3$) and three times with distilled water. After the purification, the solvent, i.e., methylene chloride, evaporated from the resultant product to obtain a white powder, and the powder was dissolved in ethyl acetate to form a precipitate by using methanol. The precipitate was dried in a vacuum oven for two days to obtain polyhedral oligomeric silsesquioxane ("POSS") substituted with bromine (structure "B" on the reaction scheme above).

Figure 3:
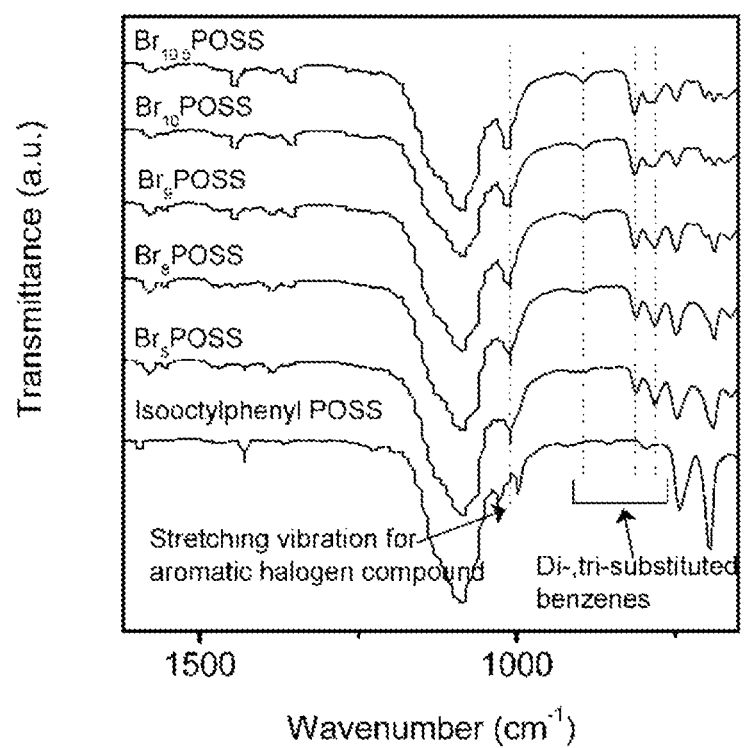
FIG. 3 is a graph of transmittance (arbitrary unit, a. u.) versus wavenumber (reverse centimeters, $cm^{-1}$) showing Fourier-transform infrared ("FT-IR") spectroscopy results of polyhedral oligomeric silsesquioxane ("POSS") substituted with bromine (structure B, Preparation Example 1), according to an embodiment.

A structure of the POSS substituted with bromine (structure B) was confirmed by Fourier-transform infrared ("FT-IR") spectroscopy (FIG. 3).

Figure 4:
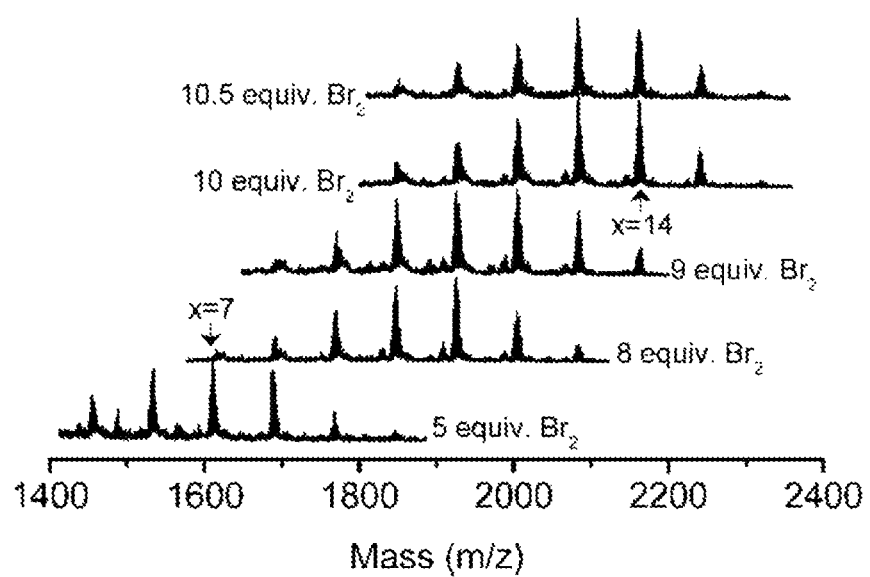
FIG. 4 is a graph showing matrix-assisted laser desorption ionization time-of-flight ("MALDI-TOF") mass spectroscopy results of POSS substituted with bromine (structure B), according to an embodiment.

Meanwhile, the number of bromines introduced in POSS substituted with bromine (structure B) according to an increase in the amount of Br by varying the amount of the bromine water as shown in Table 1 was confirmed by matrix-assisted laser desorption/ionization time-of-flight ("MALDI-TOF") mass spectroscopy (FIG. 4). The results are shown in Table 1 below.

TABLE 1

| Equivalent weight of added bromine ($Br_2$) | Number of bromines in POSS substituted with Br | |
|---|---|---|
| | $^1$H NMR | MALDI-TOF |
| 5 | 6.0 | ~7 |
| 8 | 8.8 | ~10.5 |
| 9 | 10.0 | ~11 |
| 10 | 12.3 | ~13 |
| 10.5 | 12.7 | ~13 |

Referring to Table 1 and FIG. 4, it is observed that Br-related characteristic peaks increase according to an increase of the amount of the bromine.

2) Phosphonic Ester (P(=O)(OEt)$_2$) Substitution Reaction

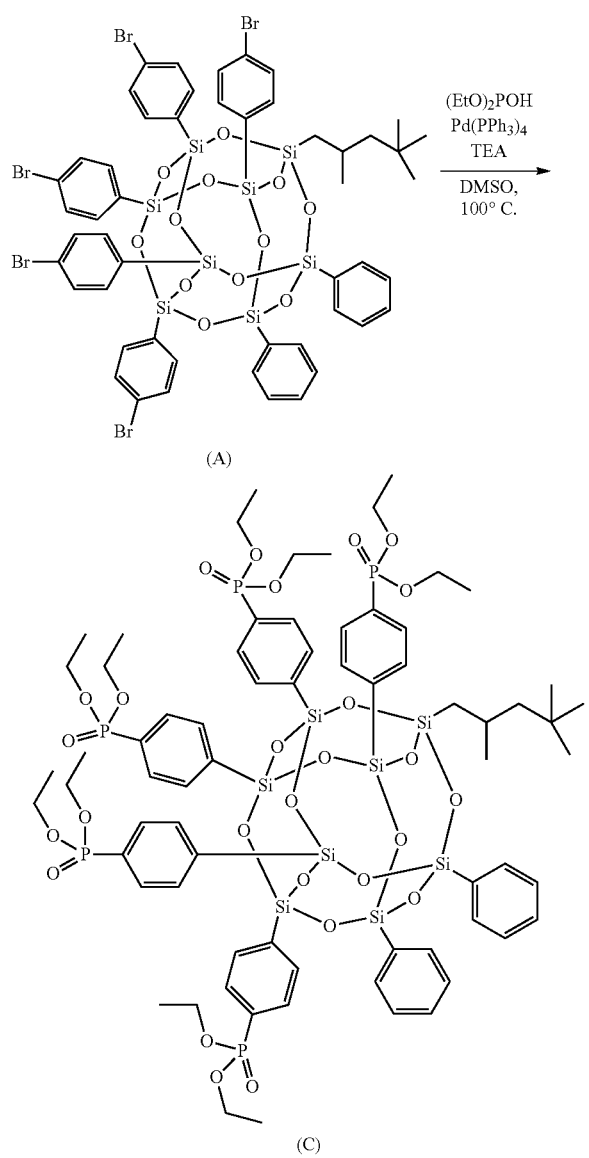

(A)

(C)

10 g of iso-octyl phenyl POSS substituted with Br (structure B), 17 ml of diethyl phosphite ((EtO)$_2$P(=O)H), 19 ml of triethylamine ("TEA"), and 8.1 g of tetrakis(triphenyl phosphine)palladium (Pd(PPh$_3$)$_4$) were dissolved in 66 g of dimethyl sulfoxide ("DMSO"), and then the resultant solution was maintained at 100° C. in a nitrogen atmosphere for 72 hours to induce a reaction therebetween.

The reaction product was stirred for 72 hours, the remaining Pd(PPh$_3$)$_4$ was removed with aluminum oxide, and the resultant product was precipitated in 1,000 milliliters ("ml") of water/methanol (10/1, volume ratio). The resulting precipitate was filtered and the filtrate was washed by pouring distilled water thereto several times. The obtained solid was dried in a vacuum oven for two days to synthesize POSS phosphonic ester (structure "C" on the reaction scheme).

Figure 5:
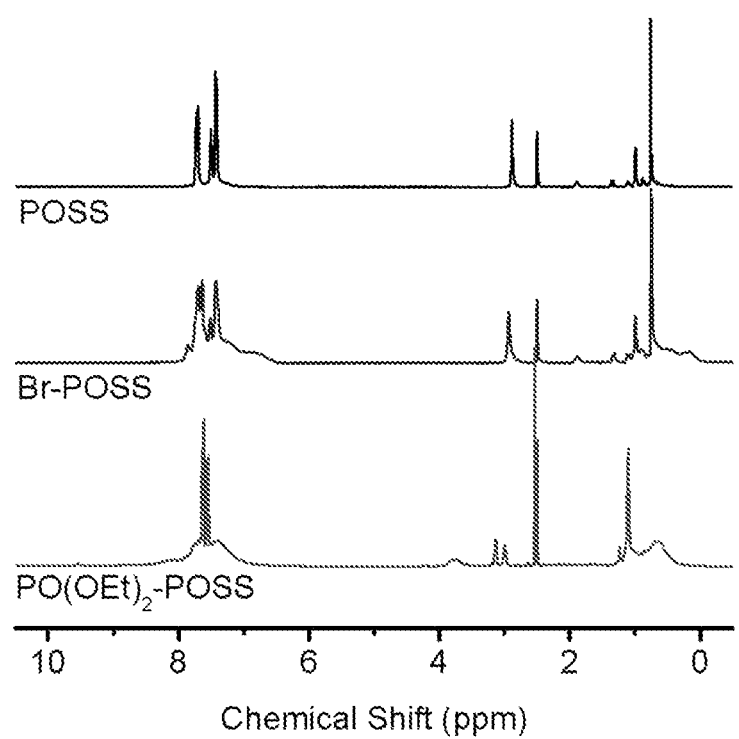
FIG. 5 is a graph showing $^1$H NMR spectrum results of POSS (structure C) synthesized according to Preparation Example 1.
Figure 6:
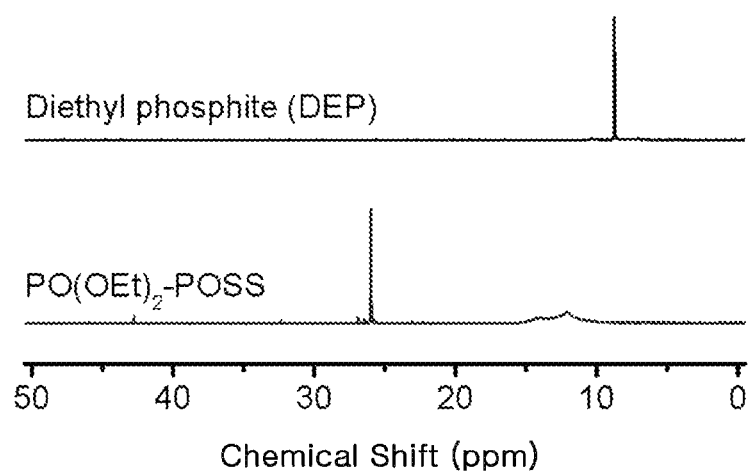
FIG. 6 is a graph showing $^{31}$P NMR spectrum results of POSS (structure C) synthesized according to Preparation Example 1.
Figure 7:
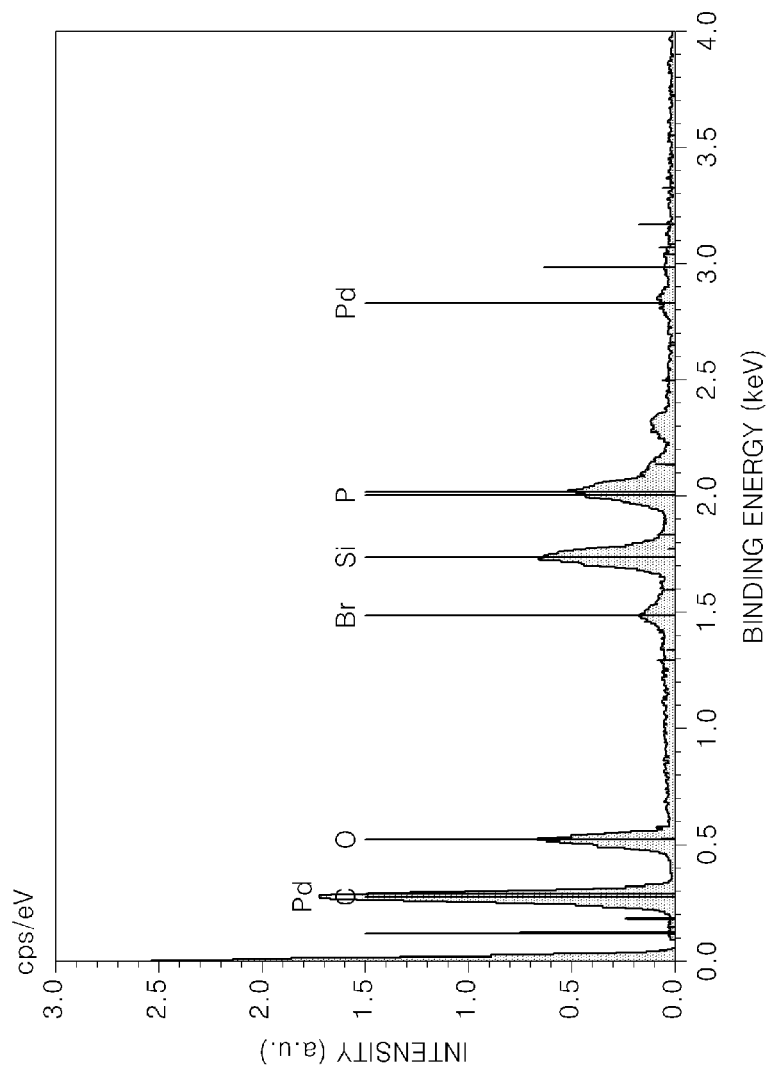
FIG. 7 is a graph of intensity (arbitrary unit, a. u.) versus binding energy (kiloelectronovolt, keV) showing energy dispersive spectroscopy ("EDS") results of POSS (structure C) synthesized according to Preparation Example 1.

A structure of the synthesized POSS phosphonic ester (structure C) was confirmed by $^1$H NMR, $^{31}$P NMR, and Energy Dispersive Spectroscopy ("EDS") (FIGS. 5 to 7).

In FIGS. 5 and 6, POSS denotes iso-octyl phenyl POSS, Br—POSS denotes iso-octyl phenyl POSS substituted with Br, and PO(=O)Et)$_2$-POSS denotes iso-octyl phenyl POSS substituted with a phosphonic ester group.

As illustrated in FIG. 7, it was confirmed that POSS phosphonic ester (structure C) was formed such that bromine of POSS substituted with Br (structure B) was substituted with a phosphonic ester group, from the fact that a peak with respect to Br decreased.

Example 1

Preparation of Electrolyte Membrane

1) Formation of Membrane 20 parts by weight of POSS phosphonic ester (structure C) and 80 parts by weight of PBI represented by Formula 55 below were dissolved in N,N'-dimethylacetamide ("DMAc"), the resultant solution was poured onto a glass plate, and a film having a thickness ranging from about 30 to about 50 μm was formed using a doctor blade.

The film was slowly heated at 60 to 120° C. to evaporate the solvent therefrom, the heated film was put in distilled water, and the film was separated from the glass plate.

Then, the separated film was washed with an excess amount of distilled water to remove the remaining solvent and dried in vacuum of 0.1 mmHg to prepare a membrane.

Formula 55

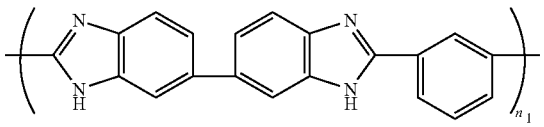

wherein n$_1$ is 30.

2) Phosphonic Ester Hydrolysis Reaction

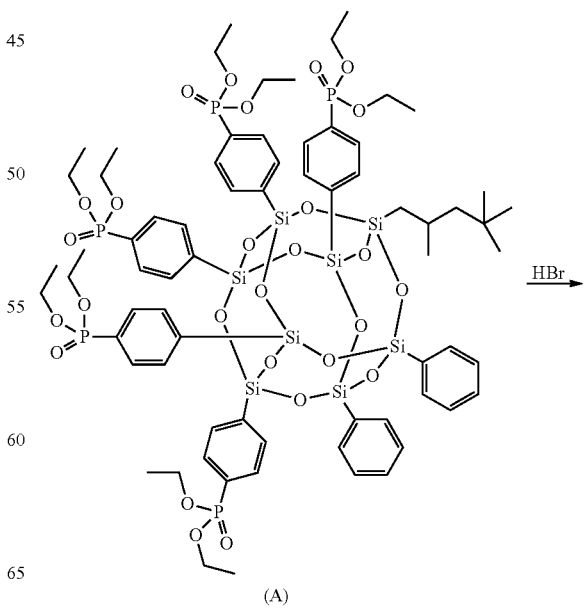

(A)

-continued

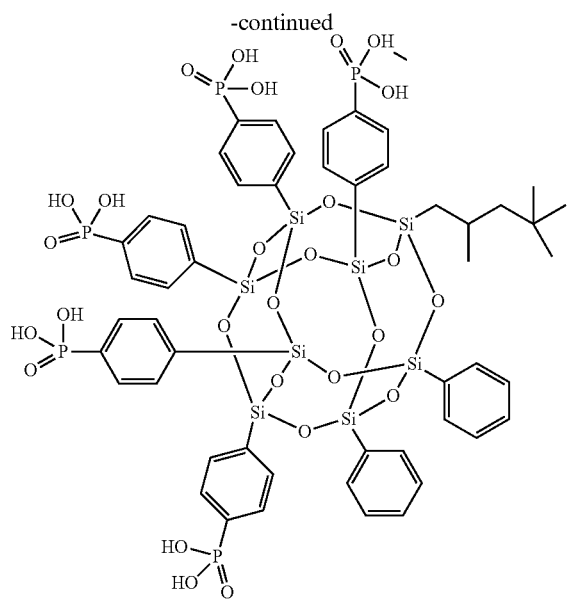

Formula 10

The dried membrane was put in a hydrobromic acid (HBr) aqueous solution at 100° C. and a process of substituting the phosphonic ester group with a phosphonic acid group was performed thereon through a reflux process for 24 hours. After 24 hours, HBr remaining in the film was washed with distilled water and the resultant membrane was dried in vacuum to prepare an electrolyte membrane.

Figure 8:
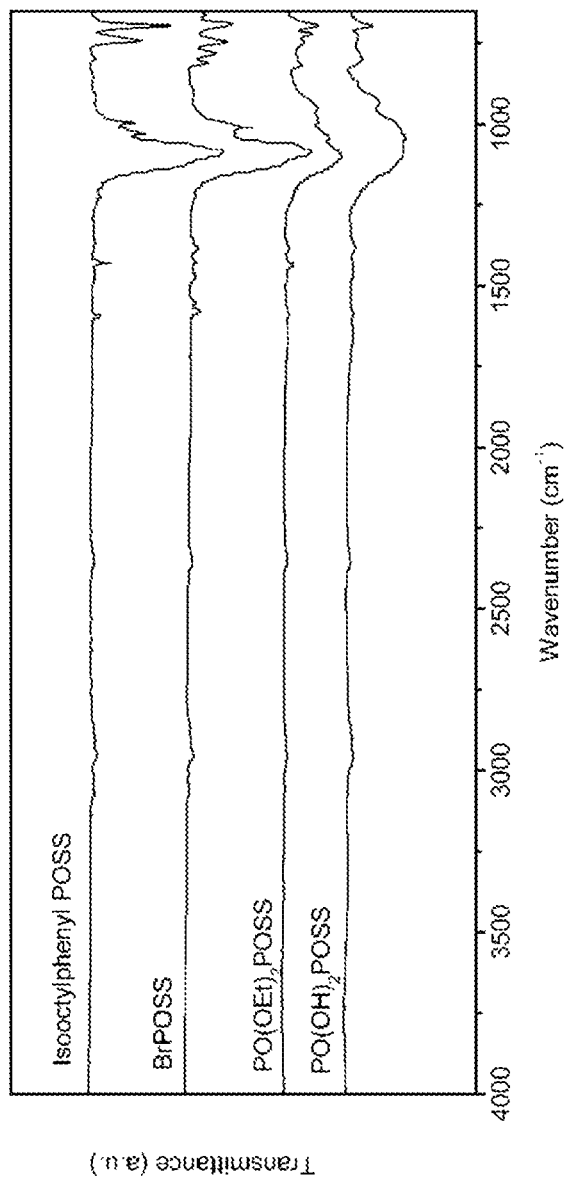
FIG. 8 is a graph of transmittance (arbitrary unit, a. u.) versus wavenumber (reverse centimeters, $cm^{-1}$) showing FT-IR spectroscopy results of BrPOSS prepared according to Example 1, iso-octylphenyl POSS, POSS phosphonic ester (P(=O)(OEt)$_2$POSS), and POSS phosphonic acid (P(=O)(OH)$_2$POSS)

The electrolyte membrane was sufficiently immersed in a $H_3PO_4$ solution at 30° C. for two days and taken out therefrom to obtain a phosphoric acid-doped electrolyte membrane. Whether the phosphonic ester ($P(=O)(OEt)_2$) group in the POSS phosphonic ester was substituted with a phosphonic acid ($P(=O)(OH)_2$) group was confirmed by FT-IR spectroscopy (FIG. 8).

Example 2

Preparation of Electrolyte Membrane

An electrolyte membrane was prepared in the same manner as in Example 1, except that POSS phosphonic ester was used in an amount of 5 parts by weight instead of 20 parts by weight, and PBI was used in an amount of 95 parts by weight instead of 80 parts by weight.

Example 3

Preparation of Electrolyte Membrane

An electrolyte membrane was prepared in the same manner as in Example 1, except that POSS phosphonic ester was used in an amount of 10 parts by weight instead of 20 parts by weight, and PBI was used in an amount of 90 parts by weight instead of 80 parts by weight.

Example 4

Preparation of Electrolyte Membrane

An electrolyte membrane was prepared in the same manner as in Example 1, except that POSS phosphonic ester was used in an amount of 1 part by weight instead of 20 parts by weight, and PBI was used in an amount of 99 parts by weight instead of 80 parts by weight.

Figure 9:
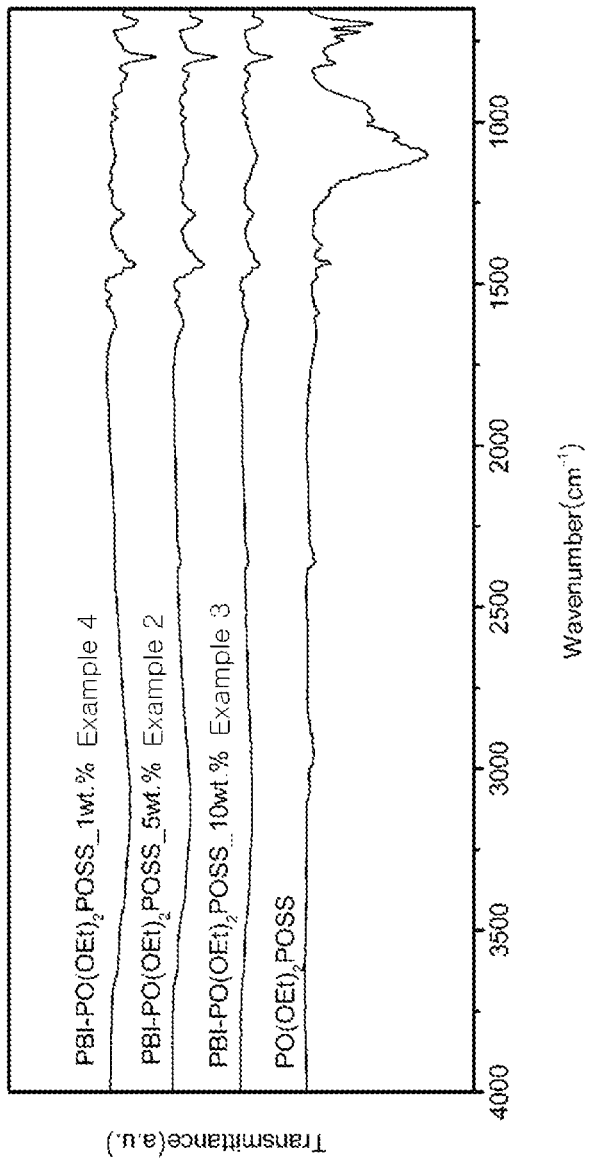
FIG. 9 is a graph of transmittance (arbitrary unit, a. u.) versus wavenumber (reverse centimeters, $cm^{-1}$) showing FT-IR spectroscopy results of P(=O)(OEt)$_2$POSS prepared according to Examples 2 to 4.
Figure 10:
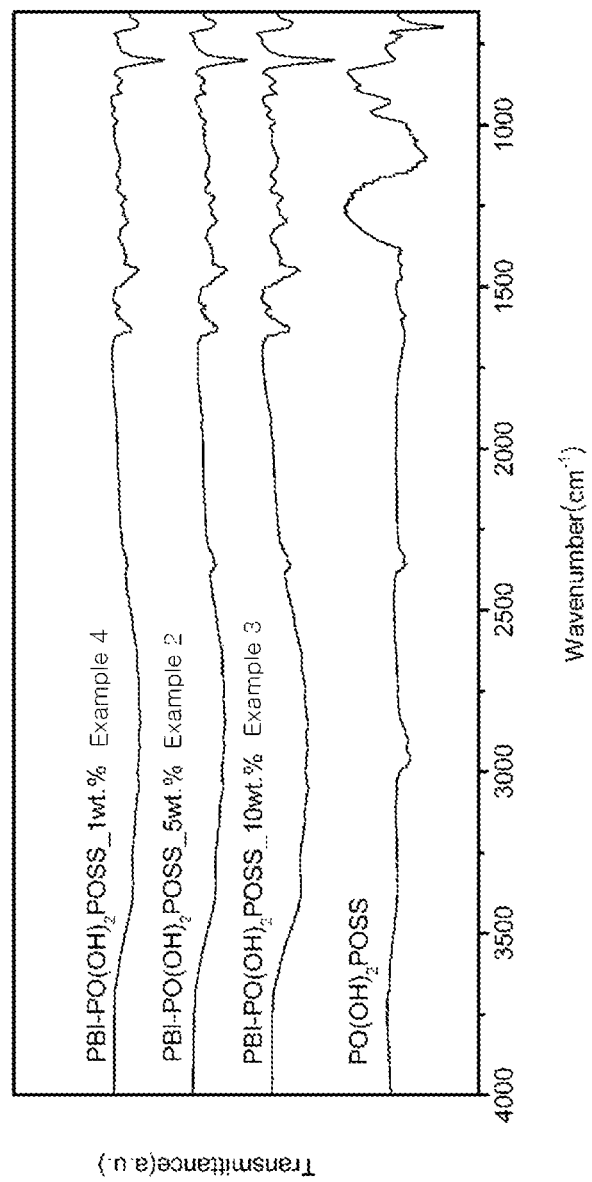
FIG. 10 is a graph of transmittance (arbitrary unit, a. u.) versus wavenumber (reverse centimeters, $cm^{-1}$) showing FT-IR spectroscopy results of P(=O)(OH)$_2$POSS prepared according to Examples 2 to 4.

In the electrolyte membranes prepared according to Examples 2 to 4, states before and after performing the phosphonic ester substitution reaction were confirmed by FT-IR spectroscopy (FIGS. 9 and 10).

FIG. 9 is a graph showing FT-IR spectroscopy results before performing the phosphonic ester substitution reaction, and FIG. 10 is a graph showing FT-IR spectroscopy results after performing the phosphonic ester substitution reaction.

Example 5

Preparation of Electrolyte Membrane

1) Formation of Membrane 5 parts by weight of POSS phosphonic ester (structure C) and 95 parts by weight of sPAES50 represented by Formula 62 were dissolved in DMAc, the resultant solution was poured onto a glass plate, and a film having a thickness ranging from about 30 to about 50 μm was formed using a doctor blade.

The film was slowly heated at 60 to 120° C. to evaporate the solvent therefrom, the heated film was put in distilled water, and the film was separated from the glass plate.

Then, the separated film was washed with an excess amount of distilled water to remove the remaining solvent and dried in vacuum of 0.1 mmHg to prepare a membrane.

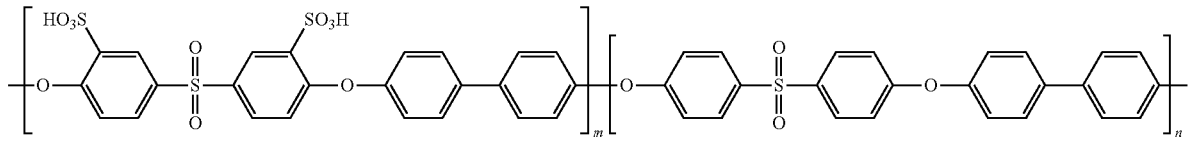

Formula 62 wherein m is 0.5 and n is 0.5, sPAES50 of Formula 62 had a polydispersity of about 4 and a number average molecular weight of 80,000.

2) Phosphonic Ester Hydrolysis Reaction

The dried membrane was put in an HBr aqueous solution at 100° C. and a process of substituting the phosphonic ester group with a phosphonic acid group was performed thereon through a reflux process for 24 hours. After 24 hours, HBr remaining in the film was washed with distilled water and the resultant film was dried in vacuum to prepare an electrolyte membrane.

The electrolyte membrane was sufficiently immersed in a $H_3PO_4$ solution at 30° C. for two days and taken out therefrom to obtain a phosphoric acid-doped electrolyte membrane. Whether the phosphonic ester ($P(=O)(OEt)_2$)

group in the POSS phosphonic ester was substituted with a phosphonic acid (P(=O)(OH)$_2$) group was confirmed by FT-IR spectroscopy.

Example 6

Preparation of Electrolyte Membrane

An electrolyte membrane was prepared in the same manner as in Example 5, except that POSS phosphonic ester was used in an amount of 10 parts by weight instead of 5 parts by weight, and sPAES50 was used in an amount of 90 parts by weight instead of 95 parts by weight.

Example 7

Preparation of Electrolyte Membrane

An electrolyte membrane was prepared in the same manner as in Example 5, except that POSS phosphonic ester was used in an amount of 20 parts by weight instead of 5 parts by weight, and sPAES50 was used in an amount of 80 parts by weight instead of 95 parts by weight.

Comparative Example 1

Preparation of PBI Film 1.5 g of a compound represented by Formula 55 below ("m-PBI") was mixed with 8.5 g of DMAc and the mixture was stirred until m-PBI was completely dissolved. A certain amount of the stirred solution was applied on a glass plate to form a film having a thickness of about 40 μm and the resulting structure was put into an oven. The temperature of the oven was slowly raised to 25 to 250° C. to dry and harden the film:

Formula 55

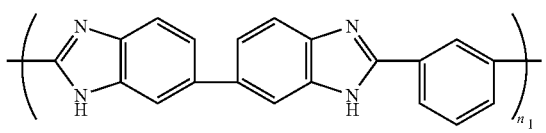

wherein in Formula 55, n$_1$ is 30.

The temperature of the oven was slowly decreased to room temperature and the film was separated from the glass plate to obtain a PBI film.

The PBI film was immersed in a H$_3$PO$_4$ solution at 30° C. for two days and taken out therefrom to obtain a phosphoric acid-doped PBI film.

Evaluation Example 1

Spectroscopic Data of POSS and POSS Composite

1) Thermal Gravimetric Analysis ("TGA")
TGA was performed on POSS phosphonic ester (structure C) (P(=O)(OEt)$_2$-POSS) prepared according to Preparation Example 1 and the compound of Formula 10 (P(=O)(OH)$_2$—POSS) obtained by a phosphonic acid substitution reaction of the POSS phosphonic ester (structure C).

The TGA was performed in a nitrogen atmosphere at a heating rate of 10 degrees centigrade per minute (° C./min), raising a temperature from room temperature to 1,000° C., and the TGA was performed by observing changes in thermogravity.

The compound of Formula 10 was prepared such that POSS phosphonic ester of Preparation Example 1 was put in an HBr aqueous solution at 100° C. and refluxed for 24 hours.

Figure 11:
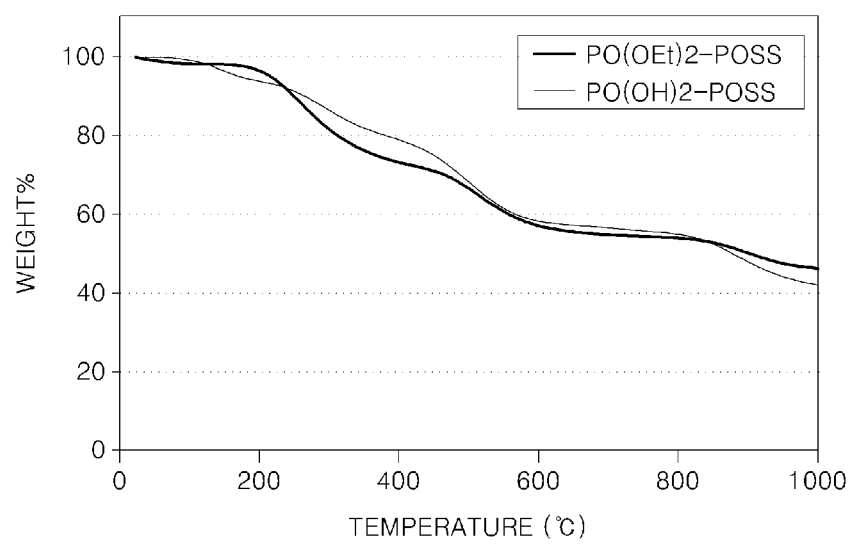
FIG. 11 is a graph of percent by weight versus temperature (° C.) showing thermal gravimetric analysis results of POSS phosphonic ester (structure C) (P(=O)(OEt)$_2$-POSS) prepared according to Preparation Example 1 and a compound represented by Formula 10 (P(=O)(OH)$_2$—POSS)

The TGA results are shown in FIG. 11.

As illustrated in FIG. 11, it was confirmed that both the POSS phosphonic ester (structure C) and the compound of Formula 10 had excellent thermal stability.

2) $^{13}$C Cross Polarization ("CP")-Magic Angle Spinning ("MAS") Nuclear Magnetic Resonance (NMR) Analysis A $^{13}$C cross polarization ("CP")-magic angle spinning ("MAS") nuclear magnetic resonance ("NMR") analysis was performed on the POSS phosphonic ester (structure C) of Preparation Example 1 (P(=O)(Et)$_2$-POSS) and the compound of Formula 10 (P(=O)(OH)$_2$—POSS) by using a NMR spectrometer (Bruker NMR 600 MHz (AVANCE III); $^{13}$C, $^{31}$P, $^{29}$Si NMR (ss 15 k)).

Figure 12:
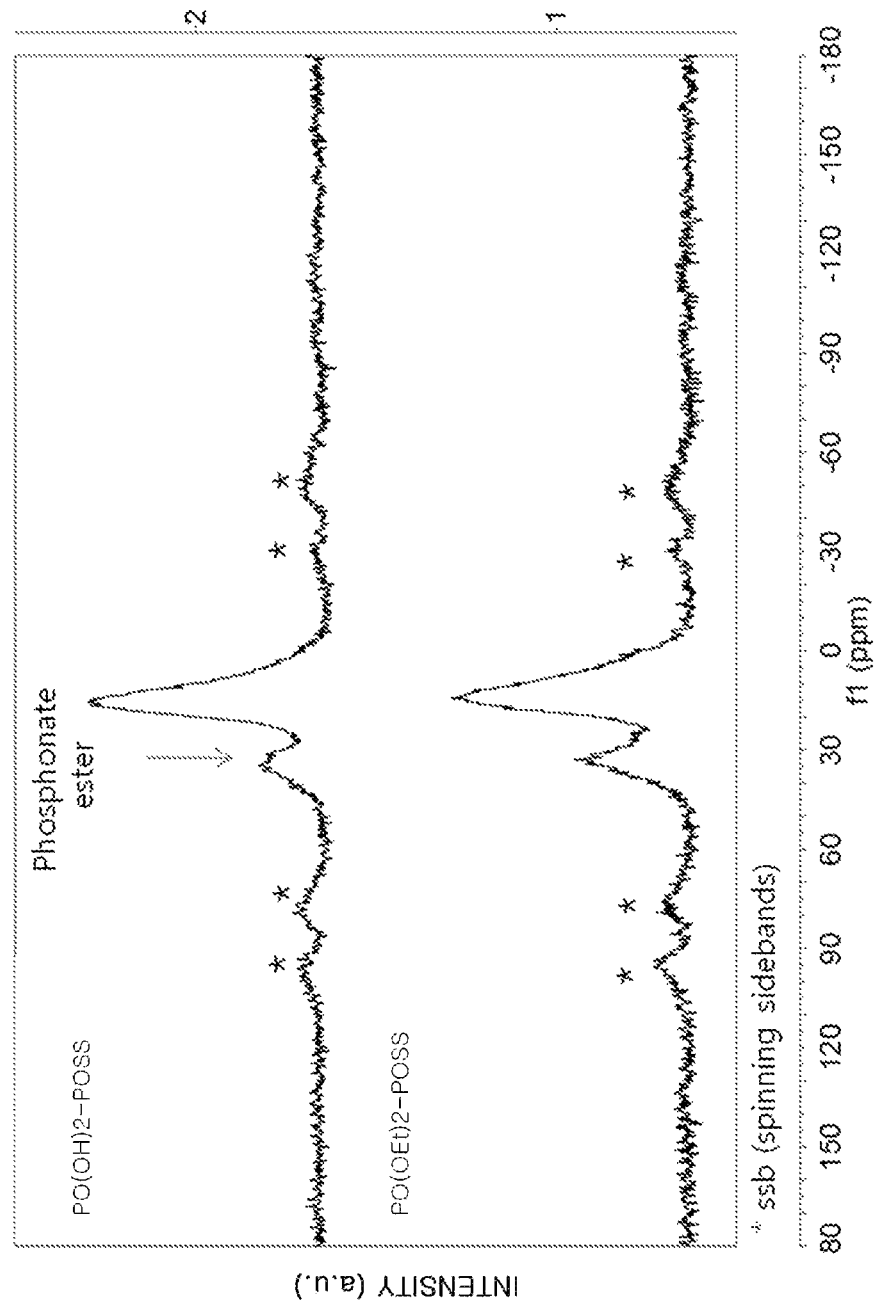
FIG. 12 is a graph showing $^{13}$C cross polarization ("CP")-magic angle spinning ("MAS") nuclear magnetic resonance ("NMR") analysis results of POSS phosphonic ester (structure C) (P(=O)(OEt)$_2$-POSS) of Preparation Example 1 and a compound of Formula 10 (P(=O)(OH)$_2$—POSS)

The analysis results are shown in FIG. 12.

As illustrated in FIG. 12, it was confirmed that a phosphonate ester-related peak in the NMR spectrum of P(=O)(OH)$_2$—POSS decreased.

3) $^{29}$Si CP-MAS NMR Analysis of the Compound of Formula 10 (P(=O)(OH)$_2$—POSS)

Figure 13:
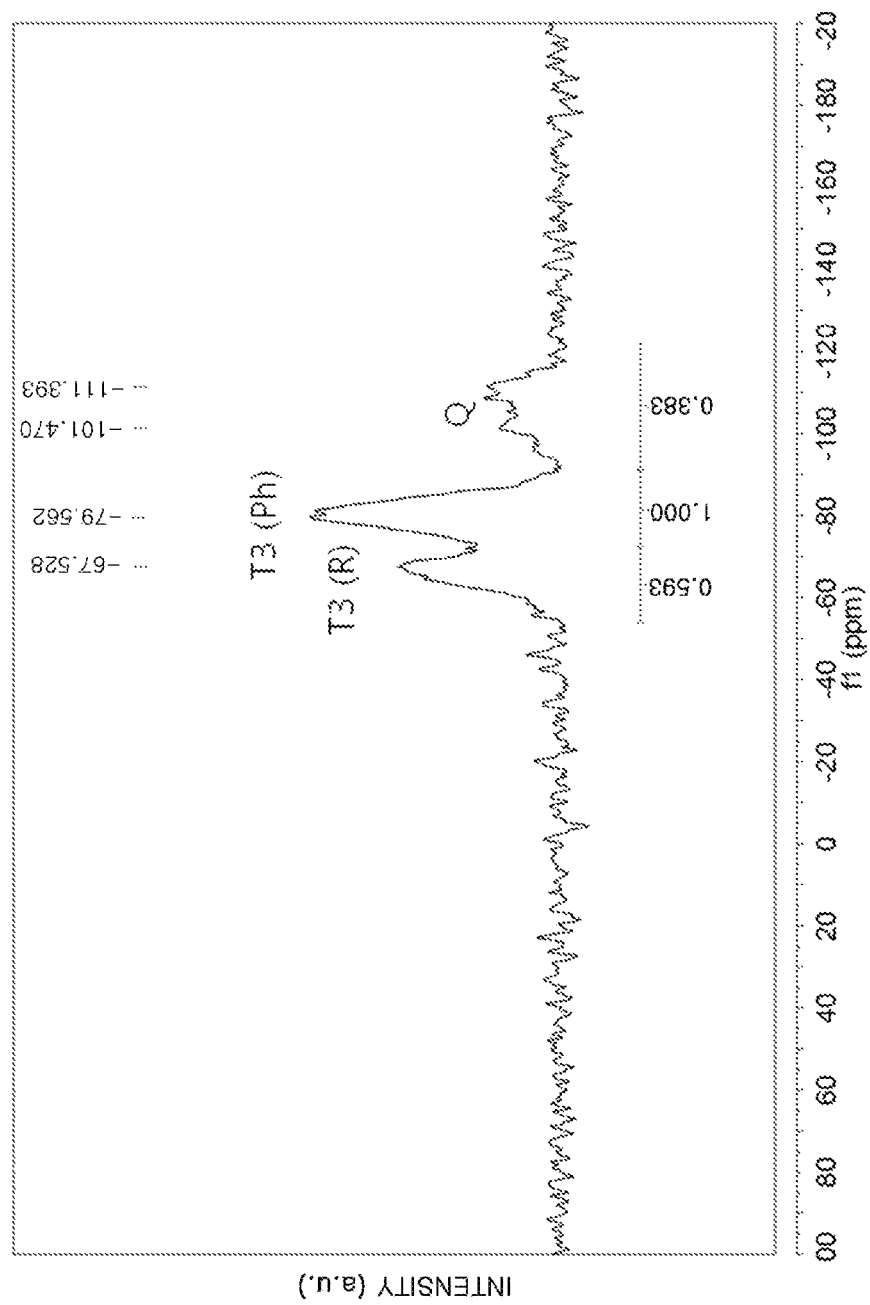
FIG. 13 is a graph showing the $^{29}$Si CP-MAS NMR spectrum of a compound of Formula 10 (P(=O)(OH)$_2$—POSS), according to an embodiment.

A $^{29}$Si CP-MAS NMR analysis was performed on the compound of Formula 10 (P(=O)(OH)$_2$—POSS) by using a NMR spectrometer (Bruker NMR 600 MHz (AVANCE III); $^{13}$C, $^{31}$P, $^{29}$Si NMR (ss 15 k)), and the analysis results are shown in FIG. 13.

The compound of Formula 10 was prepared such that POSS phosphonic ester of Preparation Example 1 was put in an HBr aqueous solution at 100° C. and refluxed for 24 hours.

4) $^{13}$C CP-MAS NMR Analysis of the Compound of Formula 10 (P(=O)(OH)$_2$—POSS)

Figure 14:
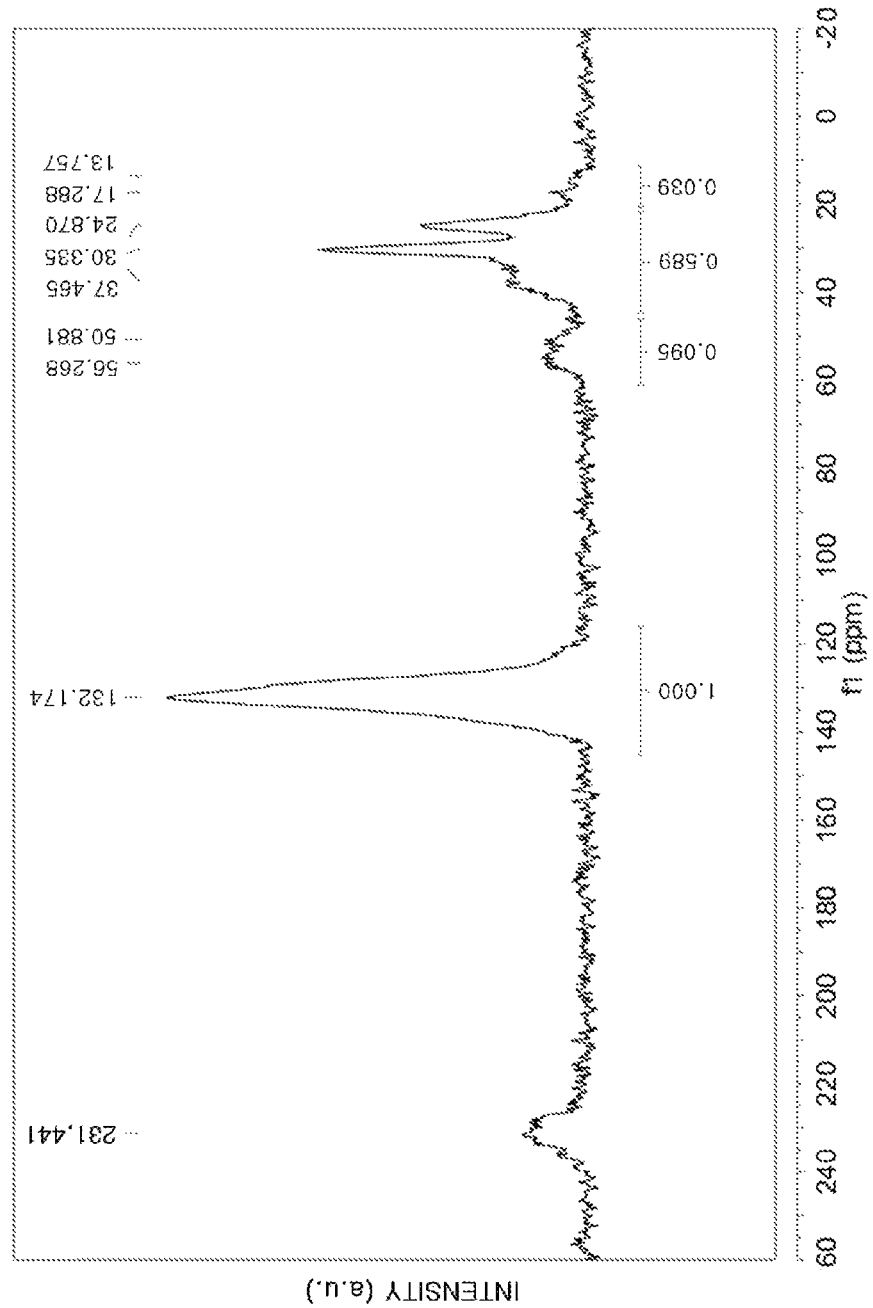
FIG. 14 is a graph showing the $^{13}$C CP-MAS NMR spectrum of a compound of Formula 10 (P(=O)(OH)$_2$—POSS), according to an embodiment.

A $^{13}$C CP-MAS NMR analysis was performed on the compound of Formula 10 (P(=O)(OH)$_2$—POSS) by using a NMR spectrometer (Bruker NMR 600 MHz (AVANCE III); $^{13}$C, $^{31}$P, $^{29}$Si NMR (ss 15 k)), and the analysis results are shown in FIG. 14.

The compound of Formula 10 was prepared such that POSS phosphonic ester of Preparation Example 1 was put in an HBr aqueous solution at 100° C. and refluxed for 24 hours.

Evaluation Example 2

Evaluation of Proton Conductivity of Electrolyte Membrane

Phosphoric acid on a surface of the phosphoric acid-doped electrolyte membrane prepared according to Example 1 and phosphoric acid on a surface of the phosphoric acid-doped PBI film prepared according to Comparative Example 1 were wiped, and the weights of the electrolyte membrane of Example 1 and the PBI film of Comparative Example 1 were measured. An impregnation level of phosphoric acid was calculated by Equation 1 below and shown in Table 2 below:

H$_3$PO$_4$ impregnation level (%)=(W−W$_P$)/W$_P$×100   Equation 1 wherein W and W$_P$ denote a weight of a membrane after being impregnated with phosphoric acid and a weight of a membrane before being impregnated with phosphoric acid, respectively,

TABLE 2

| | Impregnation level of phosphoric acid (%) |
|---|---|
| Comparative Example 1 | 117 |
| Example 1 | 92 |

Figure 15:
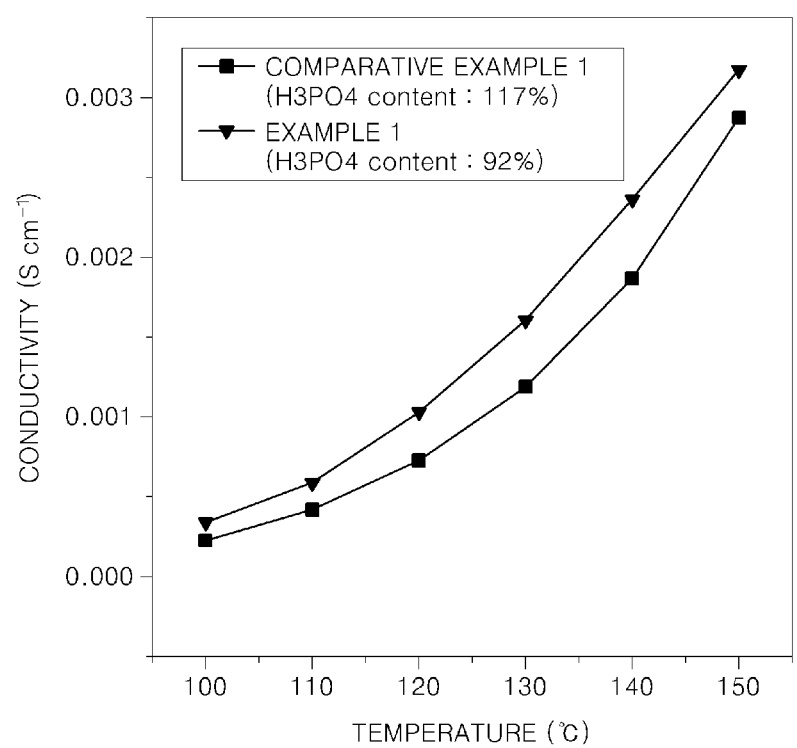
FIG. 15 is a graph of conductivity (Siemens per centimeter, S/cm) versus temperature (degrees centigrade, ° C.) showing changes in conductivity according to temperature of a phosphoric acid-doped electrolyte membrane prepared according to Example 1 and a phosphoric acid-doped PBI membrane prepared according to Comparative Example 1.

Changes in conductivity according to temperature of the phosphoric acid-doped electrolyte membrane of Example 1 and the phosphoric acid-doped PBI film of Comparative Example 1 were evaluated, and the results are shown in FIG. 15.

The conductivity was evaluated using Bekktec equipment in non-humidified conditions and a hydrogen ($H_2$) (flow rate of about 10 SCCM) atmosphere by using a 4 probe-in plane method.

As illustrated in FIG. 15, it was confirmed that the electrolyte membrane of Example 1 had a higher conductivity than that of the PBI film of Comparative Example 1 even though the electrolyte membrane of Example 1 had a lower impregnation level of phosphoric acid than the PBI film of Comparative Example 1 as shown in Table 2.

Evaluation Example 3

Analysis of Mechanical Strength of Electrolyte Membrane

Tensile strengths and elongation ratios of the electrolyte membranes prepared according to Examples 5 to 7 were measured using a universal testing machine (Model name: Lloyd LR-10K), and samples were made using ASTM standard D638 (Type V specimens) and evaluated.

The evaluation results of tensile strengths and elongation ratios thereof are shown in Table 3 below:

TABLE 3

| | Amount of POSS (parts by weight) | Tensile strength (MPa) | Elongation ratio (%) |
|---|---|---|---|
| Example 5 | 5 | 46.18 ± 10.267 | 26.426 ± 12.636 |
| Example 6 | 10 | 46.756 ± 13.054 | 32.871 ± 8.7012 |
| Example 7 | 20 | 59.586 ± 4.2284 | 14.615 ± 5.8854 |

As shown in Table 3, it was confirmed that the tensile strengths and elongation ratio of the electrolyte membranes of Examples 5 to 7 were good.

Evaluation Example 4

Evaluation of Cell Performance of Fuel Cell

Each of the electrolyte membrane of Example 1 and the PBI film of Comparative Example 1 was interposed between a cathode and an anode to manufacture a battery.

The cathode and the anode were manufactured using the following processes.

4.5 g of 10 wt % Nafion (Dopont) water-based dispersion was added to PtCo/C in which 50 wt % PtCo was supported on carbon in 3 ml of iso-propyl alcohol and the resultant solution was stirred to prepare a composition for forming a cathode catalyst layer.

The composition for forming a cathode catalyst layer was coated on a surface of carbon paper to manufacture a cathode.

An anode was manufactured using the same method as that used to prepare the cathode, except that PtRu/C (50 wt % PtRu was supported on carbon) was used instead of PtCo/C used in the composition for forming a cathode catalyst layer.

To evaluate performances of fuel cells, about 50 cubic centimeters ("ccm") of non-humidified $H_2$ and about 100 ccm of non-humidified $O_2$ were respectively supplied to the anode, the cathode and fuel cells operated at 100 to 200° C. in non-humidified conditions, and changes in cell voltage and power density according to current density were evaluated.

From the results, it was confirmed that a battery including the electrolyte membrane of Example 1 had excellent cell voltage characteristics as in a battery including the PBI film of Comparative Example 1.

Evaluation Example 5

Cell Durability Analysis

Cell durability of each of the battery including the electrolyte membrane of Example 1 and the battery including the PBI film of Comparative Example 1, both of which were manufactured according to Evaluation Example 4, was analyzed.

The cell durability was evaluated by observing changes in open circuit voltage ("OCV") while repeatedly performing an accelerated lifetime test ("ALT") mode cycle lasted for about 1 hour in which OCV and high current density states (0 to 1 Ampere per square centimeter, "$Acm^{-2}$") repeatedly occurred.

As a result of evaluation, unlike the battery including the PBI film of Comparative Example 1, cell voltage characteristics of the battery including the electrolyte membrane of Example 1 were maintained stable even after the cycle was repeatedly performed. From the result, it was confirmed that the battery including the electrolyte membrane of Example 1 had excellent cell durability for a long period of time.

As described above, according to the one or more of the above embodiments, a compound with improved proton transfer ability and thermal ability and a composite membrane including the compound, thereby exhibiting improved ionic conductivity and mechanical properties are provided. By using the composite membrane, a fuel cell with high efficiency may be manufactured.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A composite membrane comprising a composite, which is a reaction product of a composition comprising:

at least one compound comprising a cage-type structure of silsesquioxane, selected from compounds represented by Formulae 9 and 10:

Formula 9

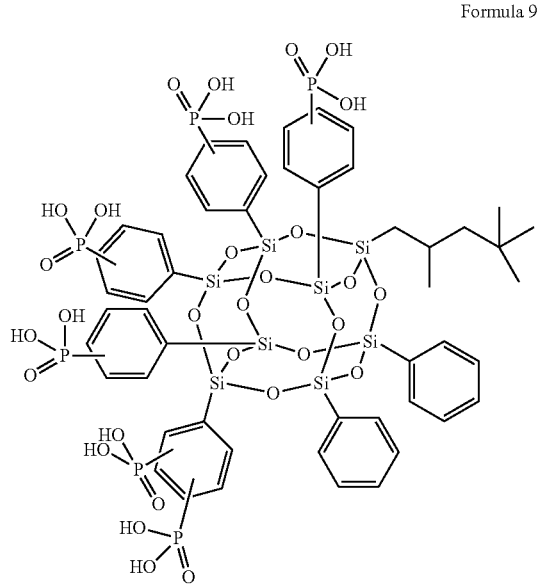

Formula 10

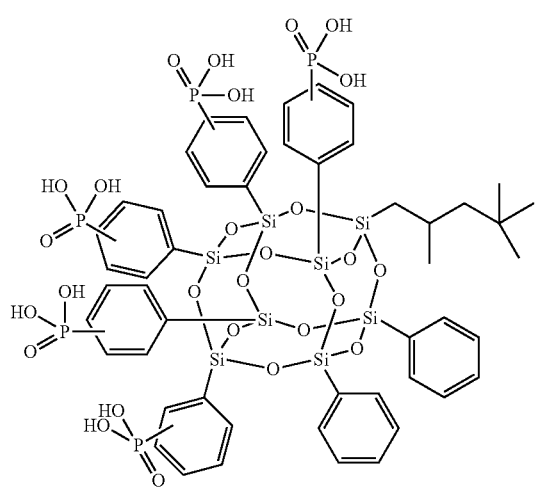

and a conductive polymer comprising at least one selected from an azole-based polymer, polyimide, polyoxazole, and a sulfonated polymer

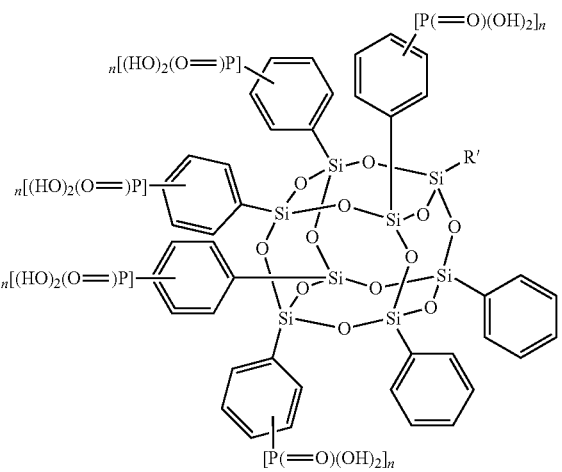

2. The composite membrane of claim 1, wherein an amount of the at least one compound comprising a cage-type structure of silsesquioxane is in a range of about 1 to 20 parts by weight based on 100 parts of the total weight of the conductive polymer and the compound comprising a cage-type structure of silsesquioxane.

3. The composite membrane of claim 1, wherein the conductive polymer comprises at least one selected from 2,5-polybenzimidazole, poly(2,2'-(m-phenylene)-5,5'-bibenzimidazole), poly(2,2'-(p-phenylene)-5,5'-bibenzimidazole), sulfonated polyarylenesulfone, perfluorinated sulfonic acid group-containing polymer, and sulfonated polyether ether ketone.

4. The composite membrane of claim 1, further comprising a phosphoric acid-based material.

5. An electrode comprising a composite, which is a reaction product of a composition comprising:

at least one compound comprising a cage-type structure of silsesguioxane, selected from compounds represented by Formulae 9 and 10:

Formula 9

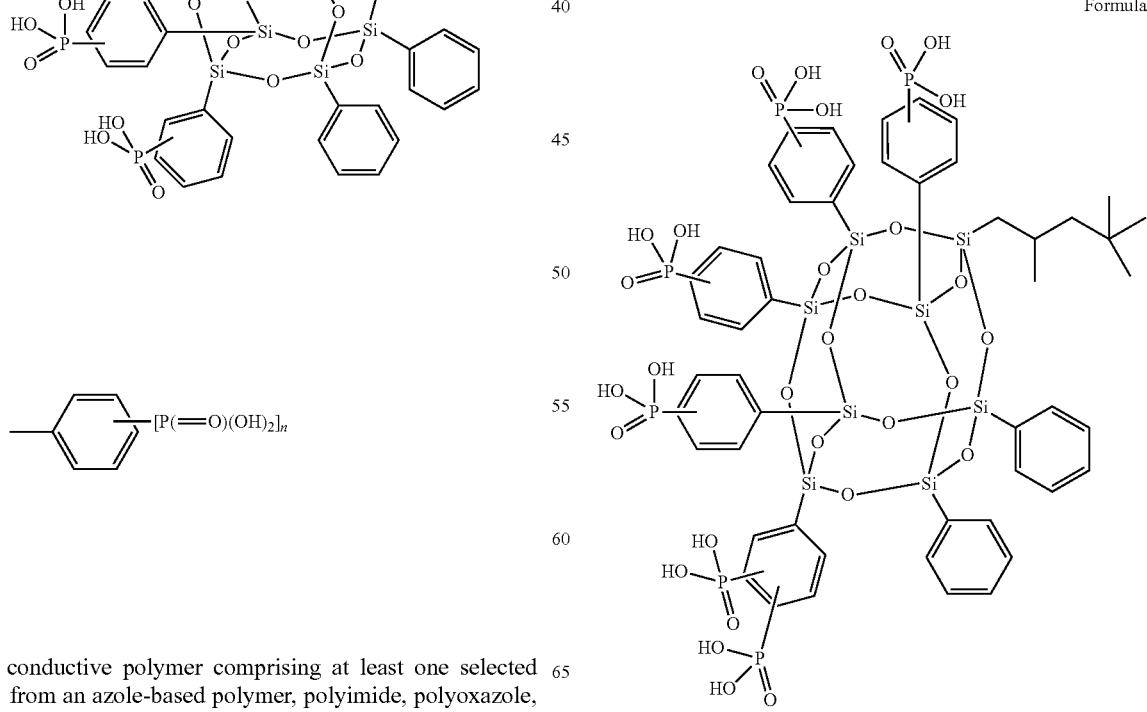

-continued

Formula 10

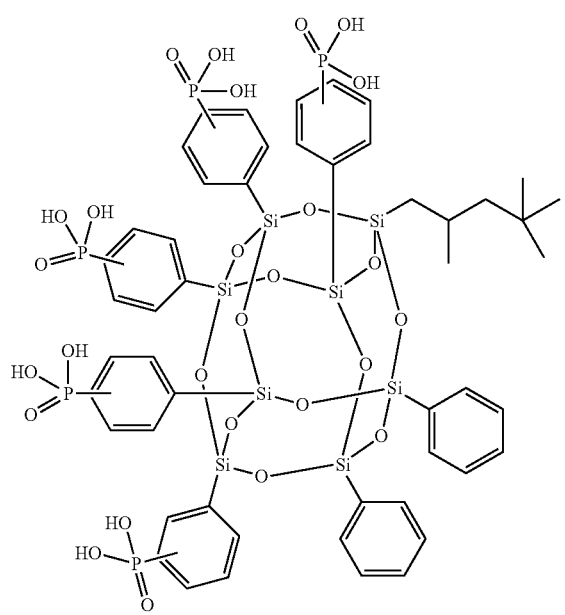

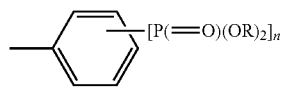

and a conductive polymer

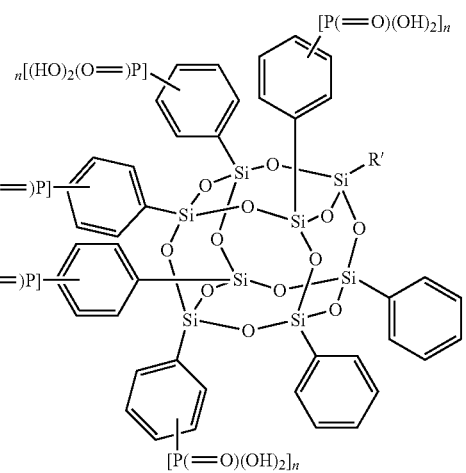

6. A fuel cell comprising a cathode, an anode, and an electrolyte membrane interposed between the cathode and the anode, wherein the electrolyte membrane is the composite membrane of claim 1.

7. A fuel cell comprising a cathode, an anode, and an electrolyte membrane interposed between the cathode and the anode, wherein at least one of the cathode and the anode is the electrode of claim 5.

* * * * *